US008166153B2

(12) United States Patent
Watai

(10) Patent No.: US 8,166,153 B2
(45) Date of Patent: Apr. 24, 2012

(54) REMOTE CONTROL SYSTEM AND CONTROLLED APPARATUS THEREIN CAPABLE OF SENDING E-MAIL IF COMMUNICATION REQUEST FAILS

(75) Inventor: Katsumi Watai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1708 days.

(21) Appl. No.: 11/082,780

(22) Filed: Mar. 18, 2005

(65) Prior Publication Data
US 2005/0243804 A1 Nov. 3, 2005

(30) Foreign Application Priority Data

Mar. 19, 2004 (JP) ................................. 2004-081255
Mar. 7, 2005 (JP) ................................. 2005-062507

(51) Int. Cl.
*G06F 15/16* (2006.01)
*G06F 15/173* (2006.01)
(52) U.S. Cl. ...................................... 709/224; 709/239
(58) Field of Classification Search .................. 709/206, 709/223–224, 239; 714/746, 749
See application file for complete search history.

(56) References Cited

U.S. PATENT DOCUMENTS

| 5,819,110 | A | 10/1998 | Motoyama |
| 6,473,812 | B2 | 10/2002 | Motoyama |
| 6,553,100 | B1* | 4/2003 | Chen et al. ...................... 379/37 |
| 6,564,337 | B1 | 5/2003 | Yoneda et al. |
| 6,889,263 | B2 | 5/2005 | Motoyama |
| 6,928,493 | B2 | 8/2005 | Motoyama |
| 6,970,952 | B2 | 11/2005 | Motoyama |
| 7,120,707 | B2 | 10/2006 | Motoyama |
| 7,136,913 | B2* | 11/2006 | Linderman .................... 709/223 |
| 7,185,080 | B1 | 2/2007 | Motoyama |
| 7,194,560 | B2 | 3/2007 | Motoyama |
| 2002/0116480 | A1* | 8/2002 | Muto ............................ 709/220 |
| 2002/0198946 | A1* | 12/2002 | Wang et al. ................... 709/206 |
| 2004/0093383 | A1* | 5/2004 | Huang et al. .................. 709/206 |
| 2005/0138432 | A1* | 6/2005 | Ransom et al. ............... 713/201 |
| 2005/0216580 | A1* | 9/2005 | Raji et al. ...................... 709/223 |

(Continued)

FOREIGN PATENT DOCUMENTS

JP 2000-194625 7/2000

(Continued)

OTHER PUBLICATIONS

Translation, Machine Translation of Goshima et al. (JP 2004-248270), Apr. 28, 2011 http://www4.ipdl.inpit.go.jp/Tokujitu/PAJdetail.ipdl?N0000=60&N0120=01&N2001=2&N3001=2004-248270.*

(Continued)

*Primary Examiner* — Joseph Avellino
*Assistant Examiner* — James Conaway
(74) *Attorney, Agent, or Firm* — Oblon, Spivak, McClelland, Maier & Neustadt, L.L.P.

(57) ABSTRACT

An apparatus is disclosed that can be remote controlled by a controlling apparatus via a network. The apparatus includes a communication request transmission unit configured to transmit a communication request including an operation request to the controlling apparatus. The apparatus further includes a mail transmission unit configured to transmit, if a normal operation response to the operation request has not been received, an e-mail message including the operation request to the controlling apparatus. This e-mail message ensures the controlling apparatus to receive the operation request that has not successfully received yet.

25 Claims, 27 Drawing Sheets

U.S. PATENT DOCUMENTS

2005/0228880 A1 * 10/2005 Champlin .................... 709/224

FOREIGN PATENT DOCUMENTS

| JP | 2001-101109 | | 4/2001 |
|----|----|----|----|
| JP | 2001-273211 | | 10/2001 |
| JP | 2003-50753 | | 2/2003 |
| JP | 2003-296255 | | 10/2003 |
| JP | 2004-30625 | | 1/2004 |
| JP | 2004-222247 | | 8/2004 |
| JP | 2004-248270 | * | 9/2004 |
| WO | WO 01/53947 A1 | | 7/2001 |

OTHER PUBLICATIONS

Japanese Office Action issued Aug. 17, 2010, in Patent Application No. 2005-062507.

* cited by examiner

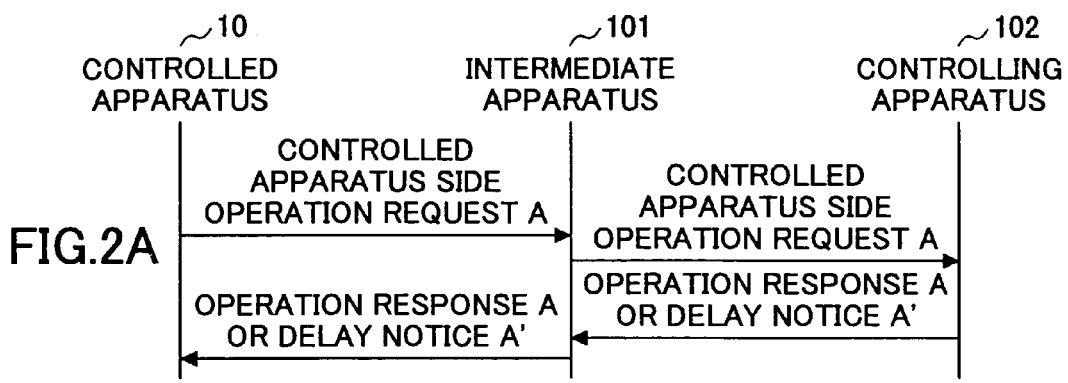
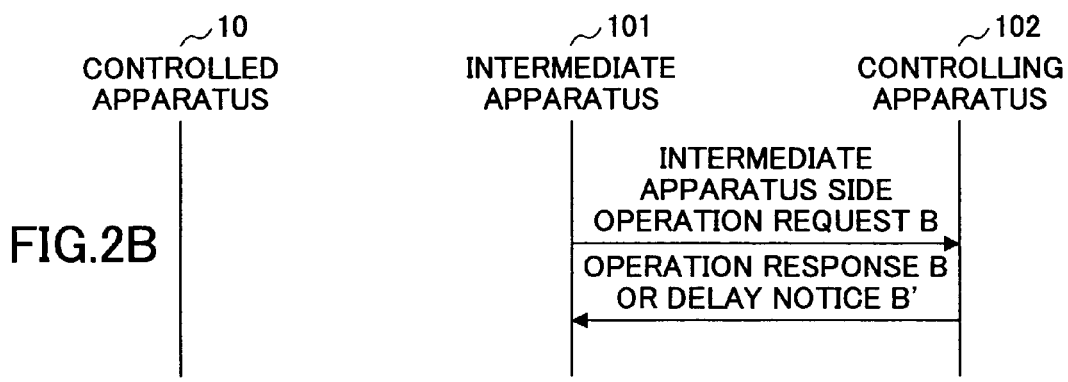
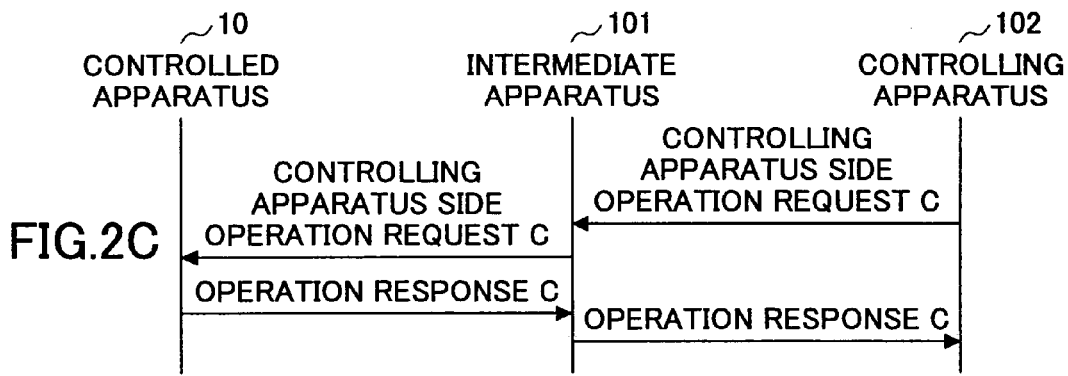
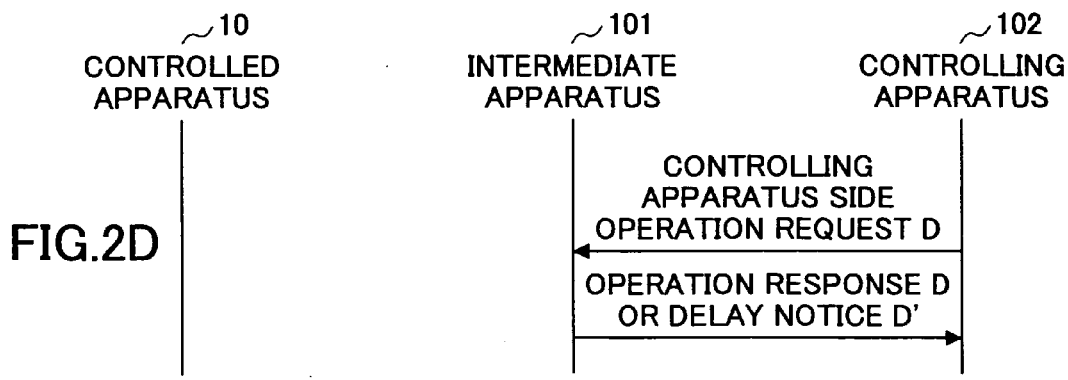

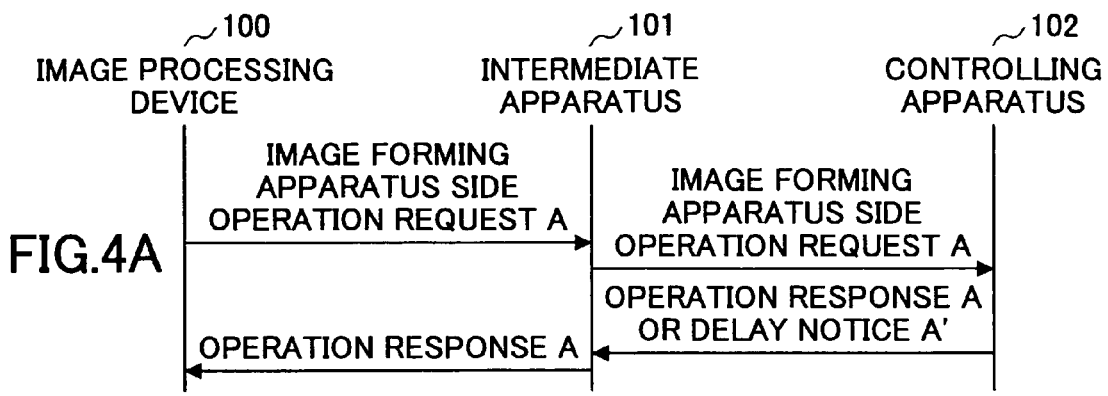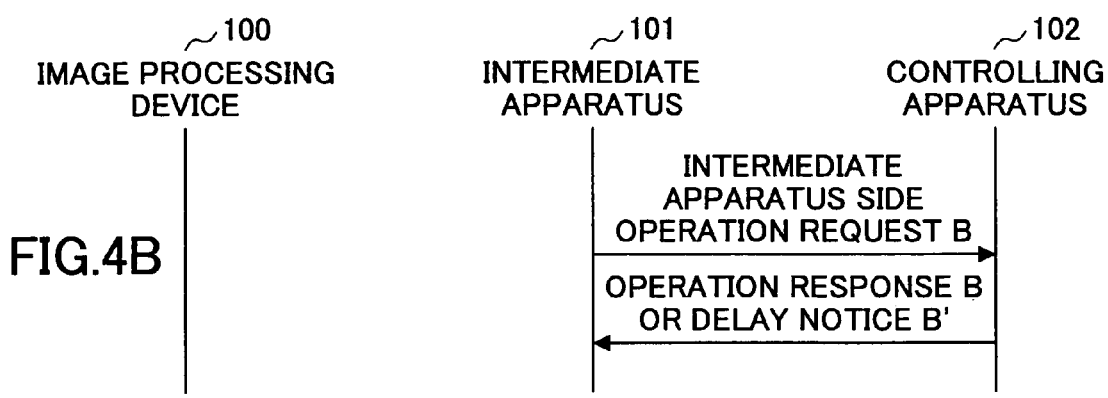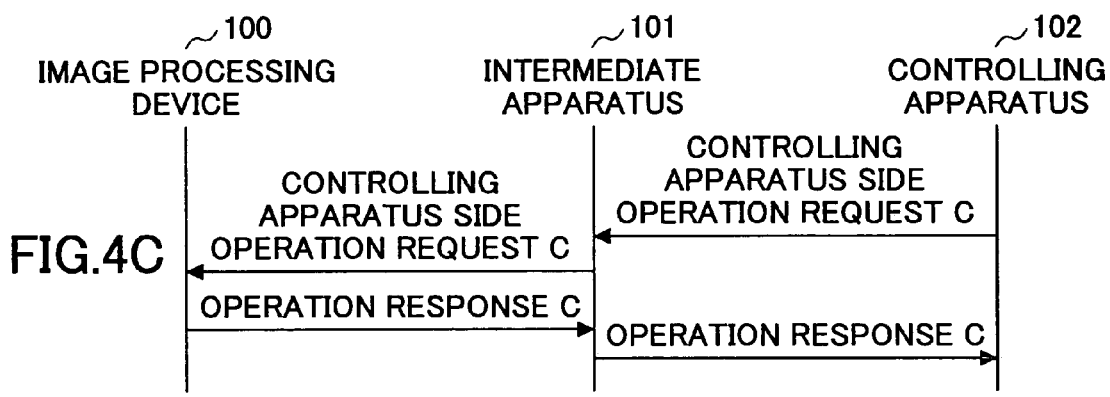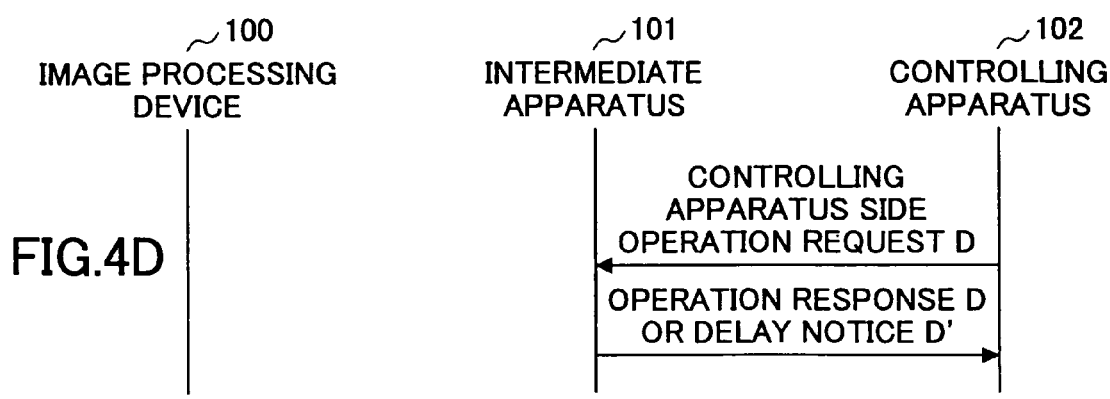

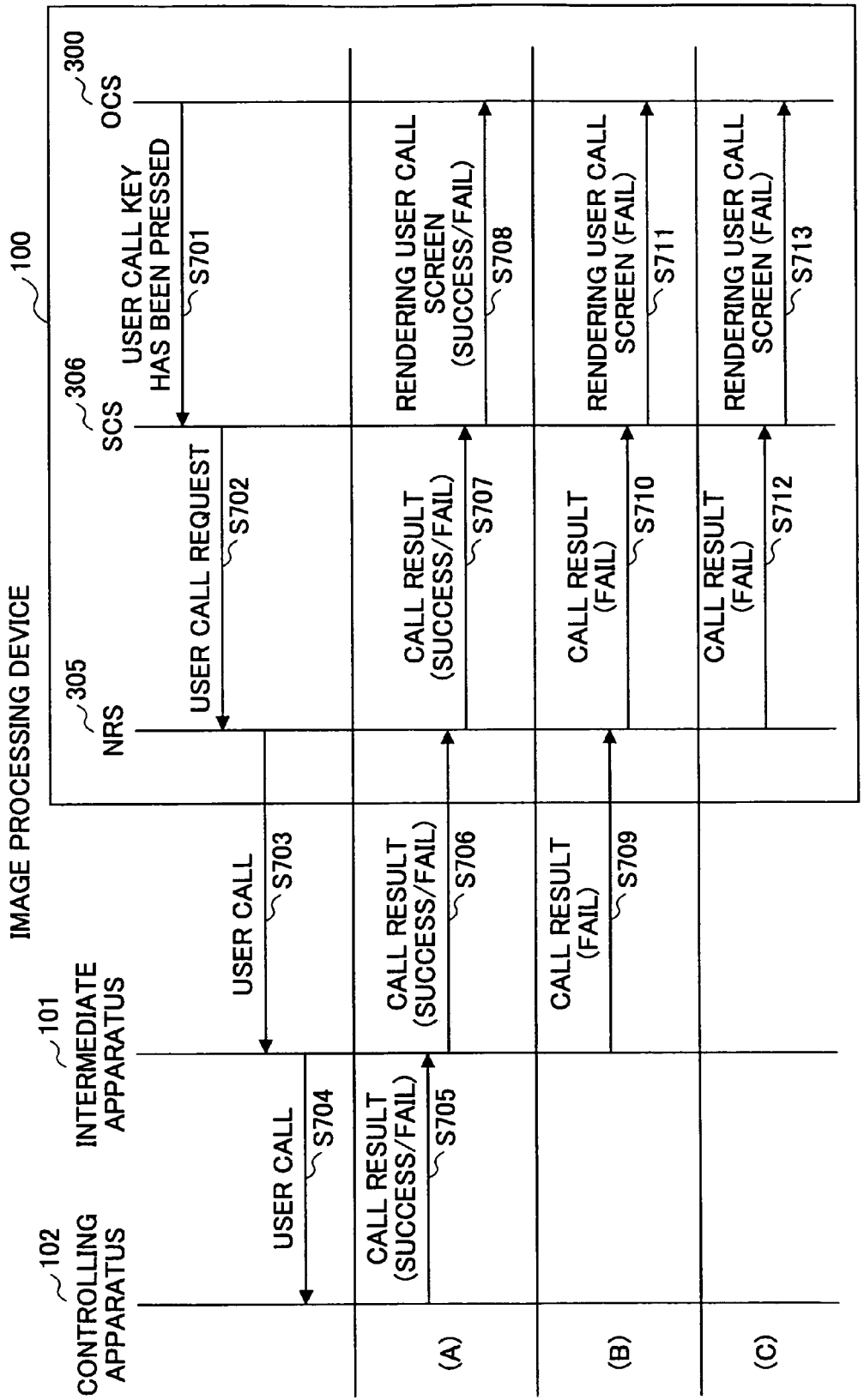

FIG.14

| CODE | CONTENTS (DETECTED SERVICEMAN CALL (SC)) |
|---|---|
| TYPE A | A state of the system in which the indication of SC is displayed on the operation unit and the system is prohibited from being used, and from which the user can not discharge the system. The system can not be reset by the controlling apparatus using "SC reset". The user can not discharge the system by turning off and on the main switch to switch the main power supply or by turning off and on the soft power supply switch to switch the power supply to the engine unit. An example of this type is SC occurred in the fixing system. |
| TYPE B | A state of the system in which only one or more functions that are detected to be abnormal are prohibited from being used. The indication of SC is displayed on the operation unit, only when the one or more functions that are detected to be abnormal are selected. |
| TYPE C | A state of the system in which the indication of SC is not displayed on the operation unit even an abnormal event occurs, but the occurrence of an abnormal event is logged. |
| TYPE D | A state of the system in which the indication of SC is displayed on the operation unit and the system is prohibited from being used, but from which the user can discharge the system by turning off and on the main switch to switch the main power supply or by turning off and on the soft power supply switch to switch the power supply to the engine unit. |

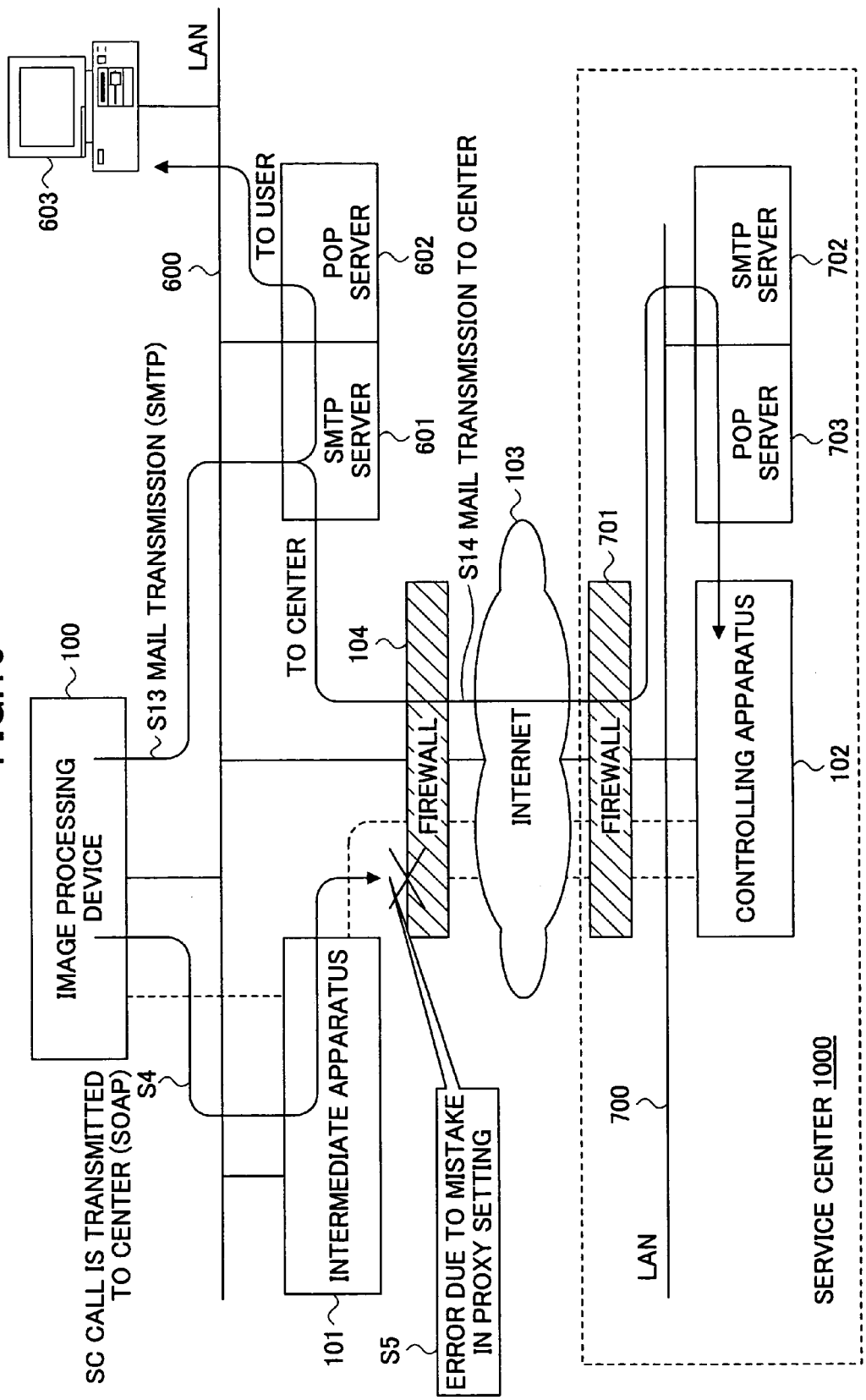

FIG.17

| <DATA ITEM> | <DATA> |
|---|---|
| EVENT TYPE | SC CALL |
| EVENT SC NUMBER | 120 |
| EVENT SUPPLY KIND | (NONE) |
| CALL RESULT | CENTER FAILURE |

S2: EVENT TYPE, EVENT SC NUMBER, EVENT SUPPLY KIND
S8: CALL RESULT

FIG.18

| <DATA ITEM> | <DATA> |
|---|---|
| EVENT TYPE | SUPPLY CALL |
| EVENT SC NUMBER | (NONE) |
| EVENT SUPPLY KIND | TONER |
| CALL RESULT | COMMUNICATION PATH FAILURE |

S2: EVENT TYPE, EVENT SC NUMBER, EVENT SUPPLY KIND
S8: CALL RESULT

FIG.19 http://127.0.0.1/user/ja/getNRSInfo.cgi&event_type=NRS_ML_SC_CENTER_FAILURE&event_sc_no=120

FIG.20 http://127.0.0.1/user/ja/getNRSInfo.cgi&event_type=NRS_ML_SUPPLY_COMMUNICATION_PATH_FAILURE&event_supply_kind=TONER

FIG.21

```
<?xml version="1.0" encoding="UTF-8" ?>
<Envelope xmlns="http://schemas.xmlsoap.org/soap/envelope/"
encodingStyle="http://schemas.xmlsoap.org/soap/encoding/">
        <Header>
        </Header>
        <Body>
                <calldevice xmlns="http://www.xxxx.co.jp/xmlnamespace/">
                        <data>
                                <deviceid>3000-123456</deviceid>
                                <calltype>2</calltype>
                                <callid>1</callid>
                                <callDetail>120</callDetail>
                        </data>
                </calldevice>
        </Body>
</Envelope>
```

FIG.22

| MODEL / MACHINE NUMBER |
| --- |
| EVENT TYPE |
| CALL ID |
| DETAILS |

FIG.23

| MAIL EVENT TYPE | MAIL NOTICE EFFECTIVE/INEFFECTIVE SETTING | DESTINATION (MULTIPLE, IF NEEDED) |
|---|---|---|
| SC CALL SUCCESS | INEFFECTIVE | (NONE) |
| SC CALL OUT OF BUSINESS HOUR | EFFECTIVE | ADMINISTRATOR |
| SC CALL FAILURE (CENTER) | EFFECTIVE | ADMINISTRATOR CENTER |
| SC CALL FAILURE (COMMUNICATION PATH) | EFFECTIVE | ADMINISTRATOR IT PERSONNEL CENTER |
| SUPPLY CALL SUCCESS | INEFFECTIVE | GENERAL AFFAIRES PERSONNEL |
| SUPPLY CALL FAILURE (CENTER) | EFFECTIVE | GENERAL AFFAIRES PERSONNEL CENTER |
| SUPPLY CALL FAILURE (COMMUNICATION PATH) | EFFECTIVE | GENERAL AFFAIRES PERSONNEL IT PERSONNEL CENTER |
| LINE DISCONNECTED | EFFECTIVE | IT PERSONNEL CENTER |

FIG.24

| DESTINATION GROUP NO. | DESTINATION GROUP NAME | DESTINATIONS |
|---|---|---|
| 1 | ADMINISTRATOR | machine1@xxx.yyy.zzz.co.jp<br>machine2@xxx.yyy.xxx.co.jp |
| 2 | GENERAL AFFAIRS PERSONNEL | supply@xxx.yyy.zzz.co.jp |
| 3 | IT PERSONNEL | it_admin1@xxx.yyy.zzz.co.jp<br>it_admin2@xxx.yyy.zzz.co.jp<br>it_admin3@xxx.yyy.zzz.co.jp |
| 4 | GROUP 4 | (NONE) |
| 5 | GROUP 5 | center@richo.jp |

FIG.25

The following failure has been identified.
The machine could not automatically transmit failure notice to center.
Please call service. Thank you.

SC123
Phone: 03-1234-5678

---

| | |
|---|---|
| Date and time of failure: | 2004/01/23 12:34:56 |
| Machine No. | A01234567890 |
| Device name: | Magio 453 (5F) |
| Comment: | 5F Center |
| Model Name: | magio Ne 453 |

TCP/IP (Ethernet)
    Host name:    RNP123456
    IP address:    123.456.789.012
    Physical address:    AB:CD:EF:01:23:45
    Domain name:    xxx.yyy.zzz.co.jp TCP/IP (IEEE 802.11b)
    Host name:    RNP654321
    IP address:    123.456.789.012
    Physical address:    01:23:45 :AB:CD:EF
    Domain name:    xxx.yyy.zzz.co.jp TCP/IP (IP over 1394)
    Host name:    RNP321654
    IP address:    123.456.789.001
    Physical address:    01:23:45:AB:CD:EF:01
    Domain name:    xxx.yyy.zzz.co.jp NetWare
    Print server name:    RNP123123
    File server name:    magione 453
    NDS tree:

AppleTalk
    Printer name:    Richo magio Ne 453
    Zone name:

SMB
    Working group name:    WORKGROUP
    Computer name:    RNP123456
    Shared name:    magioNe453

Machine State Page URL (Ethernet):
    http://123.456.789.012/
Machine State Page URL (IEEE 802.11b):
    http://123.456.789.012/
Machine State Page URL (IP over 1394):
    http://123.456.789.012/
Notice has been sent to:    Administrator

FIG.26

```
date:              2004/01/23 12:34:56
serial number:     A01234567890

<?xml version="1.0" encoding="UTF-8" ?>
<s:Envelope s:encodingStyle="http://schemas.xmlsoap.org/soap/encoding/"
     xmlns:s="http://schemas.xmlsoap.org/soap/envelope/">
    <s:Header>
        <n:requestId xmlns:n="http://www.ns.co.jp/xmlns/schema">BOX,2003-
08-12T05:52:15Z,MasterBox_TEST1,12439</n:requestId>
    </s:Header>
    <s:Body>
        <m:callDevAuto xmlns:m="http://www.co.jp/xmlns/soap">
            <input>
                <deviceid>3000-123456</deviceid>
                <calltype>2</calltype>
                <callid>1</callid>
                <callDetail>120</callDetail>
            </input>
        </m:callDevAuto>
    </s:Body>
</s:Envelope>
```

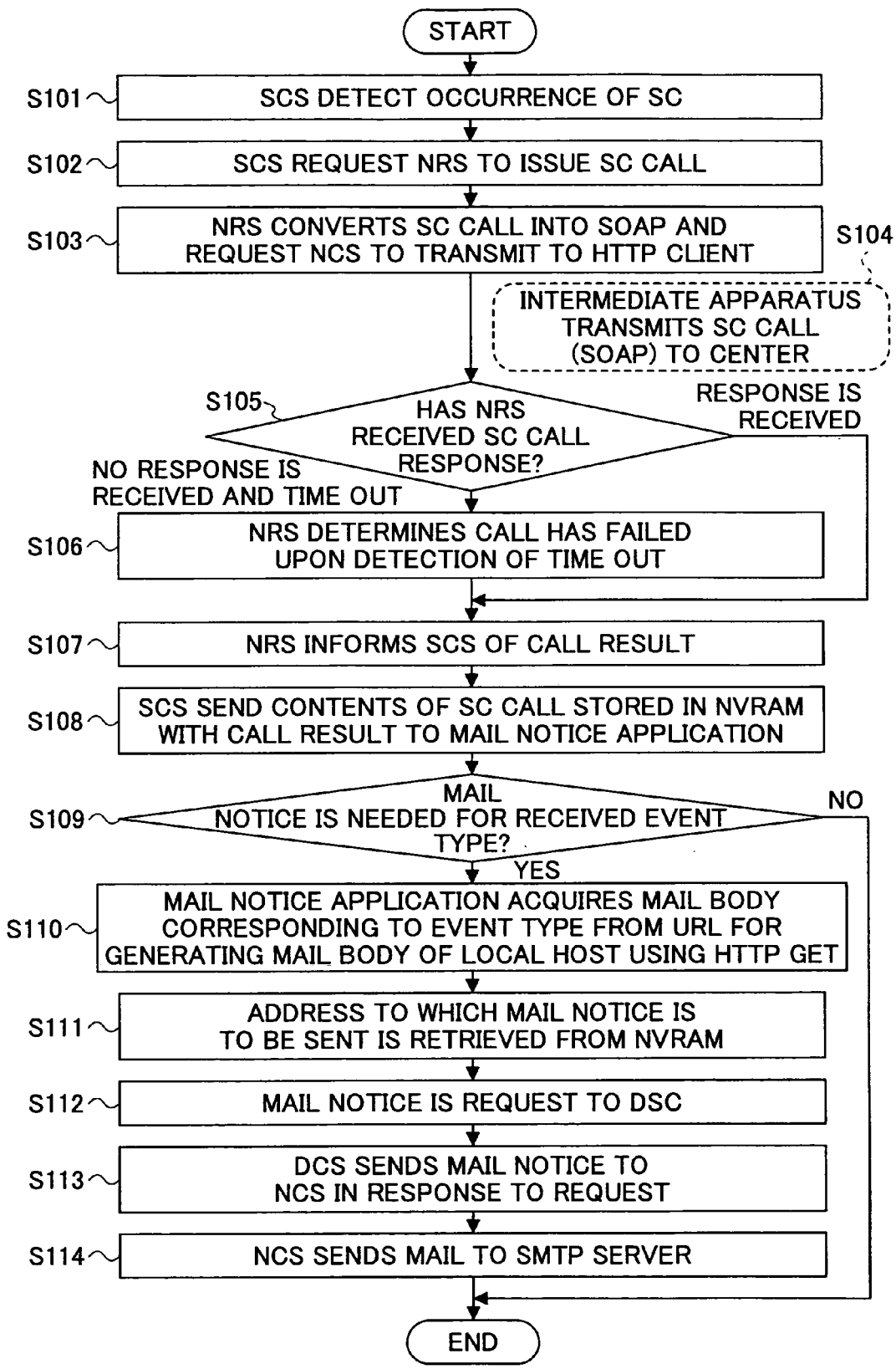

REMOTE CONTROL SYSTEM AND CONTROLLED APPARATUS THEREIN CAPABLE OF SENDING E-MAIL IF COMMUNICATION REQUEST FAILS

BACKGROUND OF THE INVENTION

1. Field of the Invention

The present invention generally relates to the remote control of an apparatus, and more particularly, to a remote control system including a controlling apparatus and an apparatus controlled by the controlling apparatus that ensures an operation request to be communicated with the controlling apparatus. The present invention also relates to a method of remote controlling an apparatus.

2. Description of the Related Art

Various remote control systems are proposed. For example, Japanese Patent Laid-Open Application No. 2004-30625 discloses a remote control system in which a controlling apparatus disposed in a service center (control center) controls various apparatuses disposed in a user's office, for example, via a network such as the Internet. An example of the apparatuses controlled by the controlling apparatus includes an image processing device such as a printer, a facsimile machine, a digital copier, and a digital multifunctional apparatus, and an image processing apparatus such as a scanner. A remote control system is further proposed in which, if a controlled apparatus does not have communication capability, an intermediate apparatus (remote control intermediate apparatus) is connected to the controlled apparatus, and the controlling apparatus controls the controlled apparatus via the network and the intermediate apparatus.

Various communication systems including multiple communication apparatuses connected via a network are practically used in which a communication apparatus sends a command requesting another communication apparatus to perform an operation, and the another communication apparatus returns the result of the operation to the communication apparatus. For example, Japanese Patent Laid-Open Application No. 2001-273211 discloses a communication system in which a remote processor transmits a message to a local processor, the message including a command that the local processor is requested to perform, and receives a response to the command from the local processor.

The above application further discloses a technique in which, if the local processor is inside fire wall, the local processor transmits a request for the transmission of a command to the remote processor outside the fire wall, and receives a command from the remote processor through the firewall as a response to the request.

Whether the controlling apparatus in the service center can communicate with the controlled apparatus or the intermediate apparatus depends on the network environment of a user site. A proxy server (fire wall) is usually provided to protect the controlled apparatus and the intermediate apparatus outside the fire wall from unauthorized access from an exterior apparatus. In this case, the controlled apparatus and the intermediate apparatus need to be set with correct parameters such as the IP address, log-in name, log-in password of the proxy server, and the URL of the center.

However, if these parameters are not set correctly, or the proxy server is not in operation due to power failure, for example, the request from the controlled apparatus or the intermediate apparatus communicated using Hyper Text Transfer Protocol (HTTP) may not reach the controlling apparatus.

If authorization information required for the communication of the intermediate apparatus is damaged, the communication may fail.

Furthermore, in the case in which the LAN (network) cable is unplugged, or the case in which the intermediate apparatus is turned off and not in operation, the request from the controlled apparatus or the intermediate apparatus may not reach the controlling apparatus.

If the communication fails, the controlling apparatus can not obtain information of the controlled apparatus or the intermediate apparatus, and the controlled apparatus and the intermediate apparatus can not make a call (message indicating abnormality) to the controlling apparatus.

SUMMARY OF THE INVENTION

Accordingly, it is a general object of the present invention to provide a novel and useful remote control system in which at least one of the above problems is eliminated.

Another and more specific object of the present invention is to allow a controlled apparatus to transmit a request for an operation to a controlling apparatus even if the controlled apparatus is disposed inside firewall or an intermediate apparatus.

To achieve at least one of the above objects, according to an aspect of the present invention, an apparatus that can be remote controlled by a controlling apparatus via a network includes a communication request transmission unit configured to transmit a communication request including an operation request to the controlling apparatus; and a mail transmission unit configured to transmit, if a normal operation response to the operation request has not been received, an e-mail message including the operation request to the controlling apparatus.

The communication request transmitted by the communication request transmission unit may be blocked by a firewall or may not processed by the controlling apparatus successfully. If the normal operation response to the operation request has not been received, an e-mail message including the operation request is transmitted by the mail transmission unit to the controlling apparatus. This e-mail message ensures the controlling apparatus to receive the operation request that has not successfully received yet.

According to another aspect of the present invention, a remote control system includes an apparatus; and a controlling apparatus configured to remote control the apparatus via a network, wherein the apparatus is configured to transmit a communication request including an operation request to the controlling apparatus, and transmit, if a normal operation response to the operation request has not been received, an e-mail message including the operation request to the controlling apparatus; and the controlling apparatus is configured to receive the communication request from the apparatus, and transmit a communication response indicating whether the receipt of the communication request has been successfully completed to the apparatus.

The communication response transmitted by the controlling apparatus allows the apparatus to know whether the communication request has been successfully received by the controlling apparatus.

Other objects, features, and advantages of the present invention will become more apparent from the following detailed description when read in conjunction with the accompanying drawings.

BRIEF DESCRIPTION OF THE DRAWINGS

FIGS. 2A-2D are sequence diagrams each showing the relation between a request for operation and a response to the request of the remote control system shown in FIG. 1;

FIGS. 4A-4D are sequence diagrams each showing the relation between a request for operation and a response to the request of the remote control system including image processing devices shown in FIG. 3;

FIG. 13 is a sequence diagram showing another communication sequence according to an embodiment;

FIG. 14 is an exemplary table containing reference standard for discriminating the type of a SC call according to an embodiment;

FIG. 16 is a network diagram showing apparatuses included in the image processing device remote control system of FIG. 3 and an exemplary flow of SC call;

FIG. 17 is a table showing the contents of a SC call stored in a NVRAM of the image processing device of FIG. 3;

FIG. 18 is a table showing the contents of a supply call stored in a NVRAM 207 of the image processing device of FIG. 3;

FIG. 19 shows an exemplary URL through which a mail notice application obtains the main body of a mail from a Web application (Websys) when a SC call has failed;

FIG. 20 shows an exemplary URL through which the mail notice application obtains the main body of a mail from a Web application when a supply call has failed;

FIG. 21 shows an exemplary format of a SOAP request of a SC call;

FIG. 22 shows main portions of the format of FIG. 21;

FIG. 23 is a table showing a portion of an exemplary setting related to a mail notice, stored in a NVRAM of FIG. 7;

FIG. 24 is a table showing the other portion of the exemplary setting of FIG. 23;

FIG. 25 shows an exemplary mail body in text format according to an embodiment;

FIG. 26 shows an exemplary mail body in XML format according to an embodiment;

FIG. 27 is a flowchart showing an exemplary process related to a SC call performed by software programs of the image processing device of FIG. 3;

DETAILED DESCRIPTION OF THE PREFERRED EMBODIMENTS

The preferred embodiments of the present invention are described in detail below with reference to the drawings.

Figure 1:
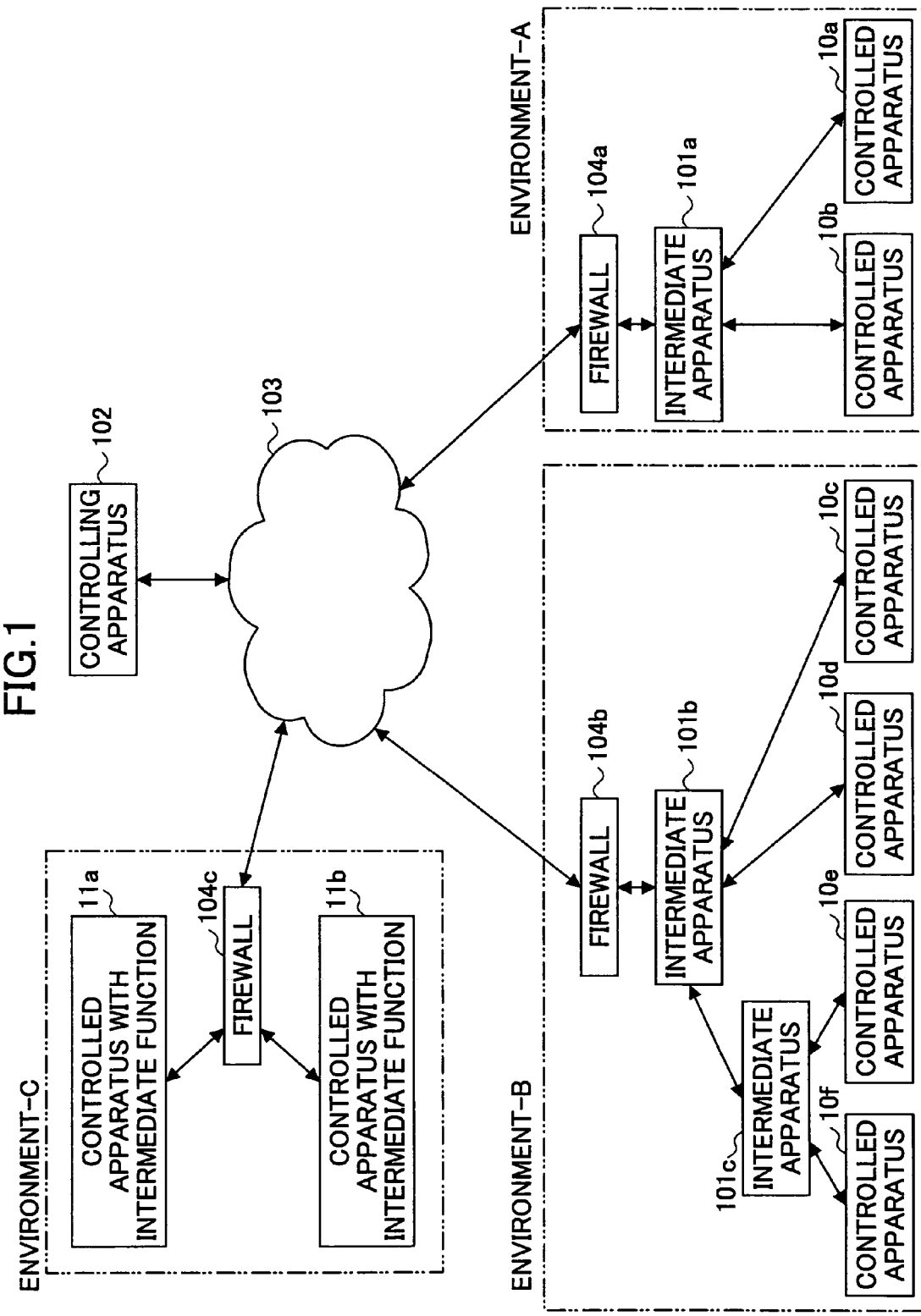
FIG. 1 is a schematic diagram showing an exemplary configuration of a remote control system according to the present invention.

FIG. 1 is a schematic diagram showing an exemplary configuration of a remote control system according to an embodiment of the present invention. In the following description, a "controlled apparatus" means an apparatus that has communication capability and is controlled by a controlling apparatus.

This remote control system includes controlled apparatuses 10a-10f (collectively referred to as 10), intermediate apparatuses 101a-101c (collectively referred to as 101), and a controlling apparatus 102. As described above, each controlled apparatuses 10 is an electronic apparatus having communication capability. Each intermediate apparatus 101 is a remote control intermediate apparatus connected to the controlled apparatus 10 via a local area network (LAN). The controlling apparatus 102 is connected to the intermediate apparatuses 101 via the Internet 103 or a public switched channel network (not shown), and functions as a server. The controlling apparatus 102 can centrally control the controlled apparatuses 10 via the intermediate apparatuses 101. The controlled apparatuses 10 and the intermediate apparatuses 101 may be disposed in a user's site such as an office, and the controlling apparatus 102 may be disposed in a service center, for example.

An example of the controlled apparatus 10 may include an image processing device such as a printer, a facsimile machine, a digital copier, and a digital multifunctional apparatus, an image processing apparatus such as a scanner, a communication apparatus such as a network home appliance, an automatic selling machine, medical equipment, a power supply, an air conditioning system, a measuring system of gas, water supply, and electricity having communication capability.

In the above remote control system, the intermediate apparatuses 101 and the controlled apparatuses 10 in environments A and B are communicably connected with each other via a LAN as shown in FIG. 1. A firewall 104a-104c (collectively referred to as 104) is disposed in each environment A, B, and C for the sake of security. This firewall 104 may be constructed by a proxy server.

A software program corresponding to new remote control service (NRS) is installed in the intermediate apparatus 101 and the controlled apparatus 10 so that the controlling apparatus 102 can remote control the intermediate apparatus 101 and the controlled apparatus 10 using a new method. Additionally, another software program corresponding to conventional remote control service (CSS) is also installed in the intermediate apparatus 101 and the controlled apparatus 10 so that the controlling apparatus 102 can remote control the intermediate apparatus 101 and the controlled apparatus 10 using a conventional method. The intermediate apparatus 101 and the controlled apparatus 10 may be initialized to realize the NRS as well as the CSS.

An example of public channel (or a leased channel) includes a fixed phone channel such as an analog channel, an ADSL channel, a digital channel (ISDN channel), and an optical fiber channel, and a mobile phone channel such as a cellular phone channel, and a PHS channel.

The connection between the intermediate apparatus 101 and the controlled apparatus 10 may be not limited to LAN. For example, the connection may be serial such as RS-485, or parallel such as Small Computer System Interface (SCSI). For example, in the case of RS-485 standard, at most five controlled apparatuses 10 can be directly connected to the intermediate apparatus 101.

The hierarchical structure formed by the intermediate apparatuses 101 and the controlled apparatuses 10 may vary depending on environments. For example, in an environment A shown in FIG. 1, the controlled apparatus 10*a* and 10*b* are accommodated to the intermediate apparatus 101*a*, and the intermediate apparatus 101*a* can establish direct connection with the controlling apparatus 102 using the Hyper Text Transfer Protocol (HTTP). Four controlled apparatuses 10 are disposed in an environment B shown in FIG. 1. If the four controlled apparatuses 10 are accommodated to only one intermediate apparatus 101*b*, the intermediate apparatus 101*b* may be overloaded.

The controlled apparatuses 10*c* and 10*d* are accommodated to the intermediate apparatus 101*b*, but the controlled apparatuses 10*e* and 10*f* are accommodated to the intermediate apparatus 10*c*, and the intermediate apparatus 101*c* is further accommodated to the intermediate apparatus 101*b*. The intermediate apparatus 101*b* can establish direct connection with the controlling apparatus 102 using the HTTP. In this case, any control information for remote controlling the controlled apparatuses 10*e* and 10*f* is transmitted by the controlling apparatus 102, relayed by the intermediate apparatus 101*b*, and 101*c*, and arrives at the controlled apparatuses 10*e* or 10*f*.

Controlled apparatuses with intermediate function 11*a* and 11*b* (may be simply referred to as "controlled apparatus") may be directly connected to the Internet 103 without intermediate apparatus 101 as shown in an environment C of FIG. 1.

Although not shown, a controlled apparatus 10 may be accommodated to the controlled apparatus with intermediate function 11.

The controlled apparatuses 10 and 11 may be connected to a terminal apparatus such as a personal computer and an electronic apparatus (exterior apparatus) via the LAN.

The intermediate apparatus 101 is provided with an application program for controlling the controlled apparatus connected thereto.

The controlling apparatus 102 is provided with an application program installed thereto for controlling the intermediate apparatuses 101, and the controlled apparatus 10 via the intermediate apparatus 101. Each node of the remote control system including the controlled apparatuses 10 can transmit an "operation request" that requests a method of the application program for processing and receive an "operation response" that indicates the result of processing by remote procedure call (RPC).

Thus, the controlling apparatus 102 can generate and transmit an operation request (may be referred to as controlling apparatus side operation request) to the controlled apparatus 10 or the intermediate apparatus 101, and receive an operation response to the operation request. On the other hand, the controlled apparatus 10 can generate and transmit an operation request (may be referred to as controlled apparatus side operation request) to the controlling apparatus 102, and receive an operation response to the operation request. Additionally, the intermediate apparatus 101 can generate and transmit an operation request (may be referred to as intermediate apparatus side operation request) to the controlling apparatus 102, and receive an operation response to the operation request.

In this description, a method means a logical function the input and output format of which are pre-defined. The operation request is a procedure call that calls the method, and the operation result is the result of the method that is called and executed by the procedure call. Some operation requests may not result in a meaningful result.

FIGS. 2A-2D show the relation between an operation request and an operation response according to an embodiment. In these drawings, the firewall 104 is ignored to make the description simple.

FIG. 2A shows the case in which the controlled apparatus 10 transmits an operation request to the controlling apparatus 102. The controlled apparatus 10 generates and transmits a controlled apparatus side operation request A to the controlling apparatus 102 via the intermediate apparatus 101. In response to receipt of the controlled apparatus side operation request, the controlling apparatus 102 generates and returns an operation response A to the controlled apparatus 10 via the intermediate apparatus 101. There may be multiple intermediate apparatuses 101 between the controlled apparatus 10 and the controlling apparatus 102 (for example, the case in which the controlled apparatus 10*e* or 10*f* in the environment B shown in FIG. 1). Since the controlled apparatus side operation request A is addressed to the controlling apparatus 102, it may be referred to as an operation request A addressed to the controlling apparatus 102.

FIG. 2A also shows the case in which a delay notice A' instead of an operation response A is returned by the controlling apparatus. When the controlling apparatus 102 receives the controlled apparatus side operation request from the intermediate apparatus 101 that has established a connection with the controlling apparatus 102, but determines that the controlling apparatus 102 can not return an operation response to the operation request while the connection is maintained, the controlling apparatus 102 transmits a delay notice to inform the controlled apparatus 10 that an operation response 101 is delayed, and terminates the connection (communicable state is discharged). The controlling apparatus 102 transmits the delayed operation response to the operation request when the next connection is established with the intermediate apparatus 101.

FIG. 2B shows the case in which the intermediate apparatus 101 transmits an operation request to the controlling apparatus 102. The intermediate apparatus 101 generates and transmits an intermediate device side operation request B to the controlling apparatus 102. In response to receipt of the operation request B, the controlling apparatus 102 returns an operation response B to the operation request B. As described above with reference to FIG. 2A, if the controlling apparatus 102 can not return the operation response B immediately, the controlling apparatus 102 returns a delay notice B'.

FIG. 2C shows the case in which the controlling apparatus 102 transmits an operation request to the controlled apparatus 10. The controlling apparatus 102 generates the operation request C and transmits it to the controlled apparatus 10 via the intermediate apparatus 101. In response to receipt of the operation request C, the controlled apparatus 10 returns an operation response C to the operation request A. In general, communication protocol used by the controlled apparatus 10 may not have function to return a delay notice. However, the intermediate apparatus 101 may return a delay notice on behalf of the controlled apparatus 10 (not shown).

FIG. 2D shows the case in which the controlling apparatus 102 transmits an operation request to the intermediate apparatus 101. The controlling apparatus 102 generates a controlling apparatus side operation request D and transmits it to the intermediate apparatus 101. In response to receipt of the operation request D, the intermediate apparatus 101 returns an operation response D to the operation request D. In this case, if the intermediate apparatus 101 can not immediately return the operation response D, the intermediate apparatus 101 returns a delay notice D' to the intermediate apparatus 101.

Simple Object Access Protocol (SOAP) is used as protocol through which RPC exchanges working parameters, and the above operation request and operation response may be expressed as a SOAP message.

According to another embodiment, an operation request may be only transmitted from the controlled apparatus 10 and/or the intermediate apparatus 101 to the controlling apparatus 102, and an operation response may be only transmitted from the controlling apparatus 102 to the controlled apparatus 10 or the intermediate apparatus 101. The present invention is still applicable to such a remote control system.

Any suitable communication protocol can be used for the transmission of an operation request and an operation response in dependence on the configuration of the remote control system. An example of communication protocols may include Hyper Text Transfer Protocol (HTTP) and Simple Mail Transfer Protocol (SMTP). In the following description, an assumption is made that the HTTP is used as the communication protocol.

The hardware construction of the controlling apparatus 102 shown in FIG. 1 is described briefly below. The controlling apparatus 102 includes a control unit, database, a modem, a proxy server, for example. The control unit further includes CPU, ROM, and RAM, for example. The controlling apparatus 102 is further described below in more detail.

The hardware construction of the intermediate apparatus 101 shown in FIG. 1 is described briefly below. The intermediate apparatus 101 includes CPU, ROM, RAM, non-volatile memory, and physical media interface (PHY), for example. The intermediate apparatus 101 is further described below in more detail.

The controlled apparatus with intermediate function 11 may be a simple combination of the controlled apparatus and an intermediate apparatus. However, the controlled apparatus with intermediate function 11 may be realized based on the controlled apparatus 10 in which a suitable application program or program module is executed using CPU, ROM, and RAM of the controlled apparatus 10.

An image processing device remote control system is described below in detail as an example of the remote control system shown in FIG. 1.

Figure 3:
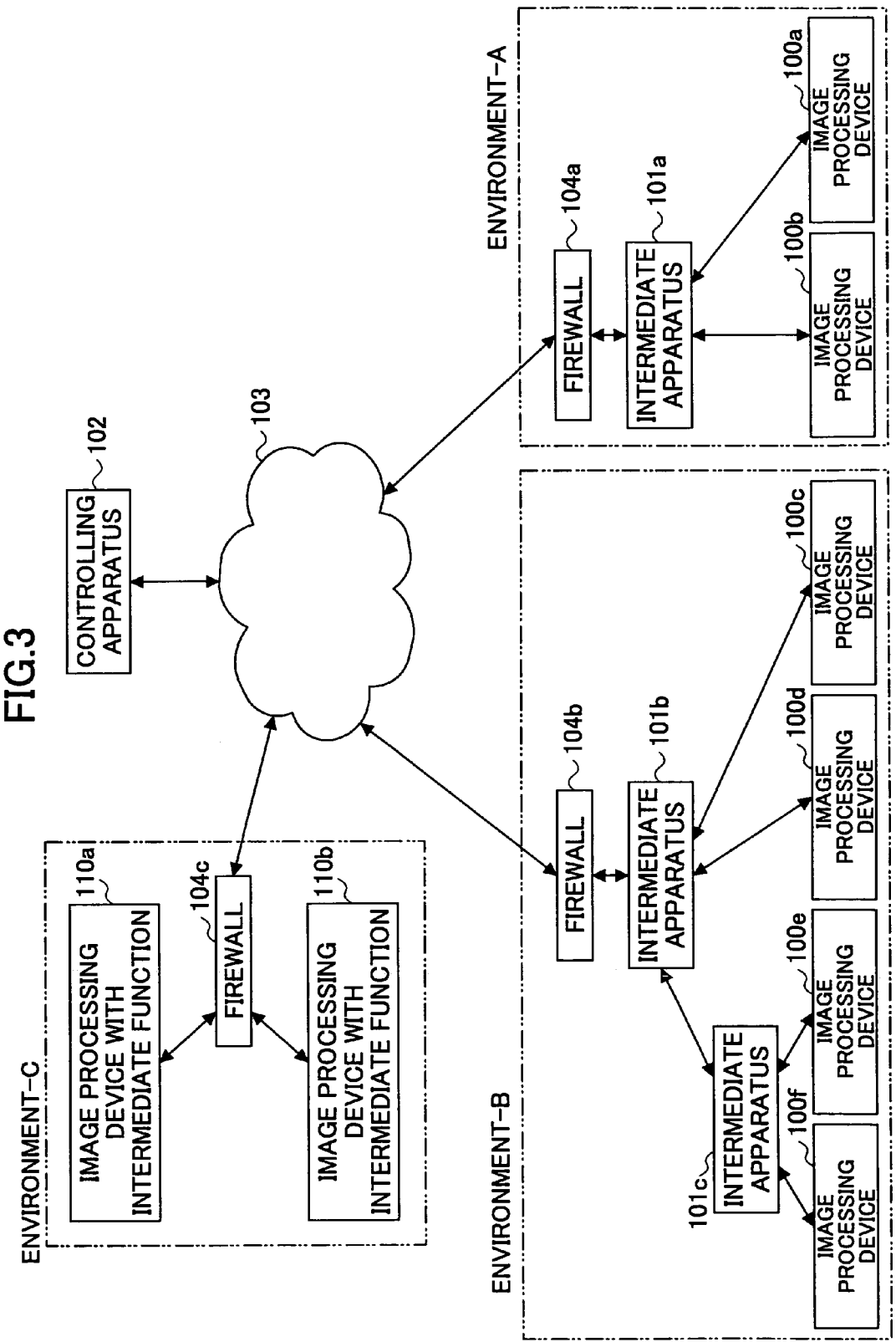
FIG. 3 is a schematic diagram showing an exemplary configuration of a control system including image processing devices according to an embodiment.

FIG. 3 is a schematic diagram showing an exemplary configuration of the image processing device remote control system. This system is different from the remote control system shown in FIG. 1 only in that the controlled apparatuses 10 are replaced with image processing devices 100, and the controlled apparatuses with intermediate function 11 are replaced with image processing devices 110. Therefore, the description of the entire system is omitted.

The image processing device 100 is a digital multifunctional apparatus that functions as a copier, a printer, a facsimile machine, a scanner, a document storage apparatus, and can communicate with exterior apparatuses. Application programs that provides services related to these functions are installed in the image processing device 100. The image processing device 110 is an image processing device 100 having the function of an intermediate apparatus 101.

The intermediate apparatus 101 in the remote control system shown in FIG. 3 is provided with an application program for controlling the image processing device 100 connected thereto as the remote control system shown in FIG. 1. The controlling apparatus 102 is provided with an application program for controlling the intermediate apparatuses 101 and controlling the controlled apparatuses 10 via the intermediate apparatuses 101 to which the controlled apparatuses 10 are connected. The intermediate apparatus 101 and the controlling apparatus 102 can transmit an "operation request" to each other for requesting the method of an installed application program of the other to perform an operation, and receive an "operation response" indicating the result of the requested operation through the remote procedure call (RPC).

FIG. 4A-4D are sequence diagrams the transmission of an operation request and the reception of an operation response according to an embodiment. In FIG. 4A-4D, the firewall is not taken into consideration.

FIG. 4A shows the case in which the image processing device 100 transmits an operation request to the controlling apparatus 102. The image processing device 100 generates and transmits an image processing device side operation request A (hereinafter referred to as "image device command") to the controlling apparatus 102 via the intermediate apparatus 101. In response to receipt of the image processing device side operation request, the controlling apparatus 102 generates and returns an operation response A (hereinafter referred to as "command response" or simply "response") to the image processing device 100 via the intermediate apparatus 101. There may be multiple intermediate apparatuses 101 between the image processing device 100 and the controlling apparatus 102. If the controlling apparatus 102 can not return the operation response immediately, the controlling apparatus 102 returns a delay notice A' in the same manner the controlling apparatus 102 does as shown in FIG. 2A.

However, because the image processing device 100 does not support the delay notice, the delay notice A' is transmitted up to the intermediate apparatus 101. If the controlling apparatus 102 can not return the operation response A within a predetermined time interval, the operation request is treated as time-out.

FIG. 4B shows the case in which the intermediate apparatus 101 transmits an operation request to the controlling apparatus 102. The intermediate apparatus 101 generates and transmits an intermediate device side operation request B (hereinafter referred to as "intermediate apparatus command") to the controlling apparatus 102. In response to receipt of the operation request B, the controlling apparatus 102 returns an operation response B to the operation request B. As described above with reference to FIG. 4A, if the controlling apparatus 102 can not return the operation response B immediately, the controlling apparatus 102 returns a delay notice B'.

FIG. 4C shows the case in which the controlling apparatus 102 transmits an operation request to the image processing device 100. The controlling apparatus 102 generates the operation request C and transmits it to the image processing device 100 via the intermediate apparatus 101. In response to receipt of the operation request C, the image processing device 100 returns an operation response C to the operation request A. As described with reference to FIG. 2C, the image processing device 100 may not support to a function for returning a delay notice.

FIG. 4D shows the case in which the controlling apparatus 102 transmits an operation request to the intermediate apparatus 101. The controlling apparatus 102 generates a controlling apparatus side operation request D (hereinafter referred to as a controlling apparatus command) and transmits it to the intermediate apparatus 101. In response to receipt of the operation request D, the intermediate apparatus 101 returns an operation response D to the operation request D. In this case, if the intermediate apparatus 101 can not immediately return the operation response D, the intermediate apparatus 101 returns a delay notice D' to the intermediate apparatus 101.

As described above, the transmission and reception of the operation request and the operation response are performed symmetrically between the image processing device 100 and the controlling apparatus 102 and between the intermediate apparatus 101 and the controlling apparatus 102 as RPC level. However, the transmission and reception of the operation request and the operation response are not symmetric at communication level.

The communication sequence of the remote control system is described below.

Figure 5:
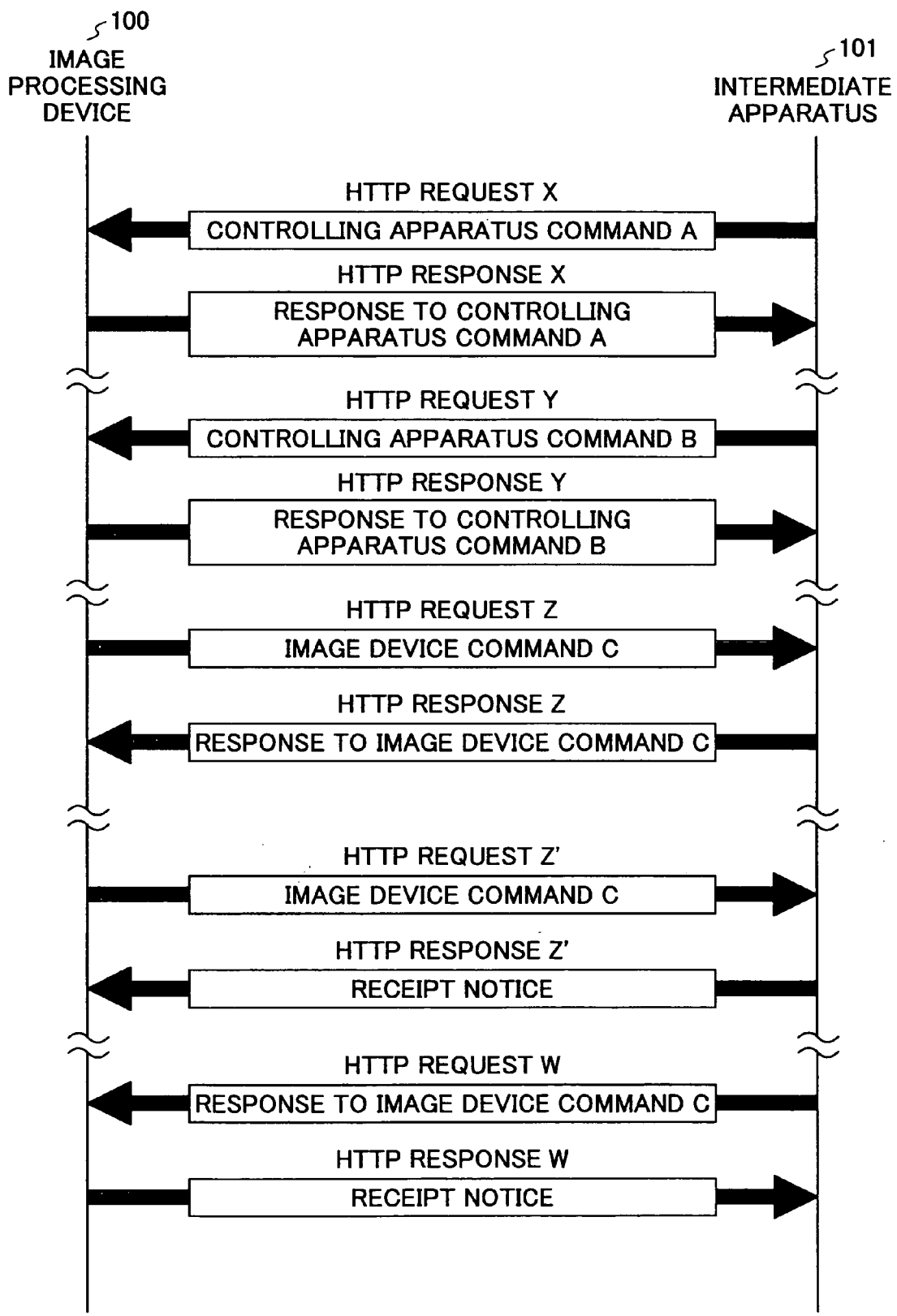
FIG. 5 is a sequence diagram showing the communication sequence between an image processing device and an intermediate apparatus according to an embodiment.

FIG. 5 is a sequence diagram showing the communication sequence between the image processing device 100 and the intermediate apparatus 101 according to an embodiment.

As shown in FIG. 5, the image processing device 100 and the intermediate apparatus 101 exchange an operation request as a HTTP request and an operation response as a HTTP response. Because there is no firewall between the image processing device 100 and the intermediate apparatus 101, both the image processing device 100 and the intermediate apparatus 101 can start communication by transmitting a HTTP request to each other (that is, both the image processing device 100 and the intermediate apparatus 101 can function as a communication server). For example, such communication is feasible that the intermediate apparatus 101 transmits a HTTP request X to the image processing device, which returns a HTTP response X, or that the image processing device 100 transmits a HTTP request Z to the intermediate apparatus 101, which returns a HTTP response Z.

As described above, when the controlling apparatus command is transmitted to the image processing device 100 via the intermediate apparatus 101, the intermediate apparatus 101 includes the controlling apparatus command in a HTTP request, and transmit the HTTP request (HTTP requests X and Y) to the image processing device 100. When the image processing device 100 returns a response to the controlling apparatus command, the image processing device 100 includes the response in a HTTP response to the HTTP request, and transmit the HTTP response (HTTP response X and Y) to the controlling apparatus 102.

To the contrary, when the image processing device 100 transmits an image device command to the controlling apparatus 102 via the intermediate apparatus 101, the image processing device 100 includes the image device command in a HTTP request, and transmits the HTTP request (HTTP request Z) to the intermediate apparatus 101. The intermediate apparatus 101 includes a response to the image device command in a HTTP response to the HTTP request, and transmits the HTTP response (HTTP response Z) to the image processing device 100.

In the latter case, it may take time from the transmission of an image device command to the controlling apparatus 102 to the receipt of a response to the image device command. To solve this problem, when the image processing device 100 transmits a HTTP request (HTTP request Z') containing an image device command to the intermediate apparatus 101, the intermediate apparatus 101 returns a HTTP response (HTTP response Z) containing a receipt notice to the image processing device 100, transfers the image device command to the controlling apparatus 102, and waits for a response to the image device command from the controlling apparatus 102. When the intermediate apparatus 101 receives the response to the image device command from the controlling apparatus 102, the intermediate apparatus includes the response in a HTTP request (HTTP request W), and transmits the HTTP request to the image processing device 100. Thus, the image processing device 100 can receive the response to the image device command. The image processing device 100 returns a HTTP response (HTTP response W) containing a receipt notice of the response to the image device command to the intermediate apparatus 101.

In the following description, the case in which the response is included in a HTTP response Z is described below.

Figure 6:
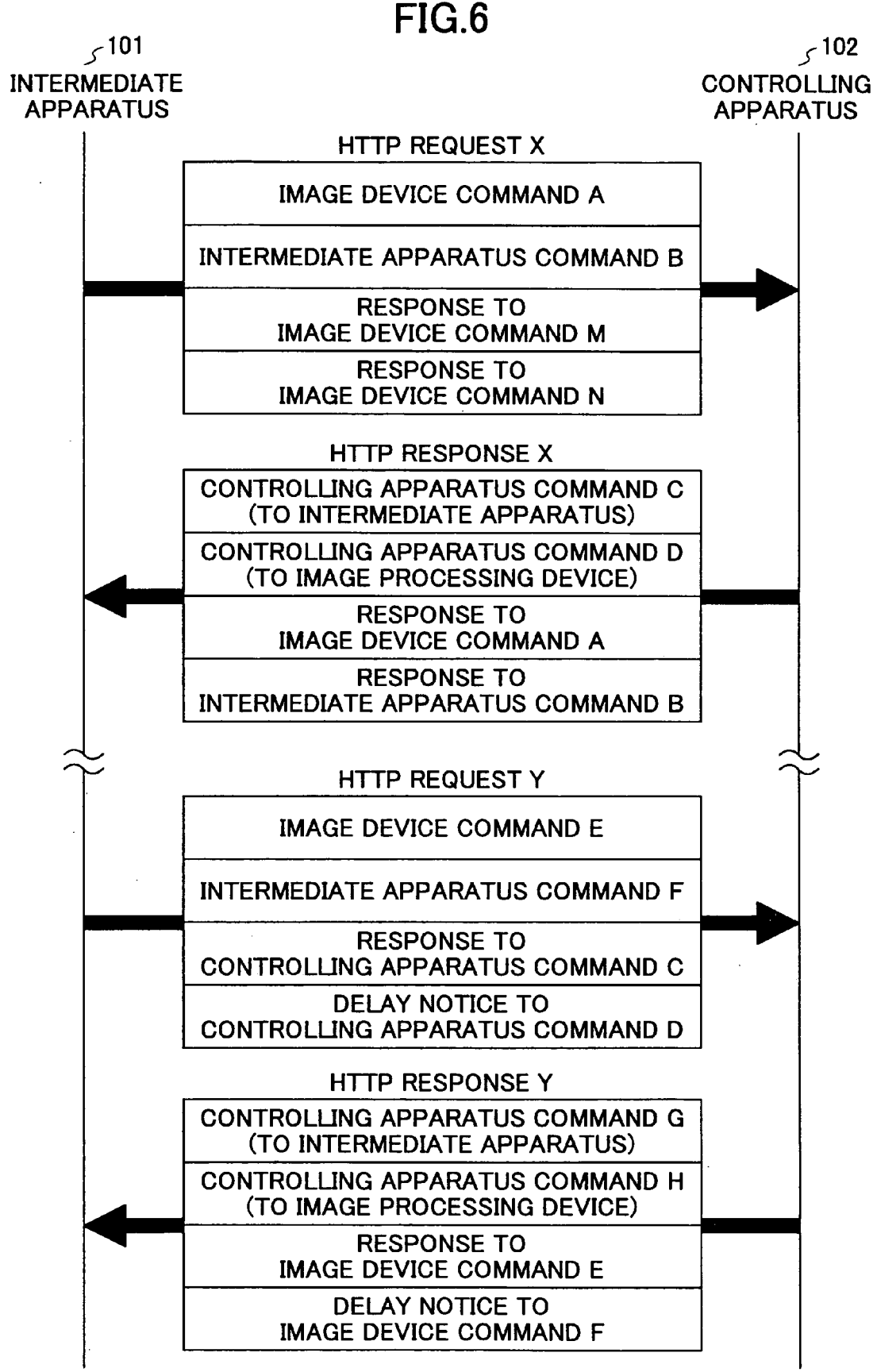
FIG. 6 is a sequence diagram showing the communication sequence between an intermediate apparatus and a controlling apparatus according to an embodiment.

FIG. 6 is a sequence diagram showing the communication sequence between the intermediate apparatus 101 and the controlling apparatus 102 according to an embodiment.

Since there is a firewall 104 between the intermediate apparatus 101 and the controlling apparatus 102, communication between the intermediate apparatus 101 and the controlling apparatus 102 is performed following the following procedure: the intermediate apparatus 101 transmits a HTTP request as a communication request to the controlling apparatus 102, and the controlling apparatus 102 returns a HTTP response as a communication response to the intermediate apparatus 101. For example, the intermediate apparatus 101 transmits a HTTP request X to the controlling apparatus 102 and, in response to receipt of the HTTP request X, the controlling apparatus 102 returns a HTTP response X to the intermediate apparatus 101. In the same manner, the intermediate apparatus 101 transmits a HTTP request Y, and the controlling apparatus 102 transmits a HTTP response Y.

The HTTP request transmitted to the controlling apparatus 102 from the intermediate apparatus 101 contains an intermediate apparatus command which is an operation request originated by the intermediate apparatus 101 to the controlling apparatus 102 and an image device command which is an operation request originated by the image processing device 100 to the controlling apparatus 102. The HTTP request further contains a response (command response) to the controlling apparatus command originated by the controlling apparatus 102 to the intermediate apparatus 101 and a response to the controlling apparatus command originated by the controlling apparatus 102 to the image processing device 100. Additionally, the HTTP response transmitted from the controlling apparatus 102 to the intermediate apparatus 101 contains a controlling apparatus command which is an operation request originated by the controlling apparatus 102 to the intermediate apparatus 101 or the image processing device 100. The HTTP response further contains a response to the intermediate apparatus command which is an operation request originated by the intermediate apparatus 101 to the controlling apparatus 102, and a response to the image device command which is an operation request originated by the image processing device 100 to the controlling apparatus 102. If a delay notice is transmitted, the command response may not be transmitted.

For example, if an image device command A and an intermediate apparatus command B are contained in a HTTP request X that is transmitted from the intermediate apparatus 101 to the controlling apparatus 102, the command response or the delay notice to the image device command A and the intermediate apparatus command B may be contained in a HTTP response X corresponding to the HTTP request X that is transmitted from the controlling apparatus 102 to the intermediate apparatus 101. Controlling apparatus commands C and D are contained in the HTTP response X corresponding to the HTTP request X that is transmitted from the controlling apparatus 102 to the intermediate apparatus 101, but the command response or the delay notice to the controlling apparatus commands C and D are contained in the next HTTP request Y.

The delay notice returned by the intermediate apparatus 101 in response to the control apparatus command D addressed to the image device is not generated by the image processing device 100 but by the intermediate apparatus 101 as described below.

In the cases shown in FIG. 4A or 4B, as soon as the intermediate apparatus 101 receives the image device command or generates the intermediate apparatus command, the intermediate apparatus 101 can establish a connection with the controlling apparatus 102 and transmit a HTTP request containing the image device command or the intermediate apparatus command. However, in the cases shown in FIG. 4C or 4D, the firewall provided to the side of the intermediate apparatus 101 blocks HTTP requests from the controlling apparatus. The controlling apparatus 102 can not access the intermediate apparatus 101 immediately to transmit the controlling apparatus commands.

Figure 7:
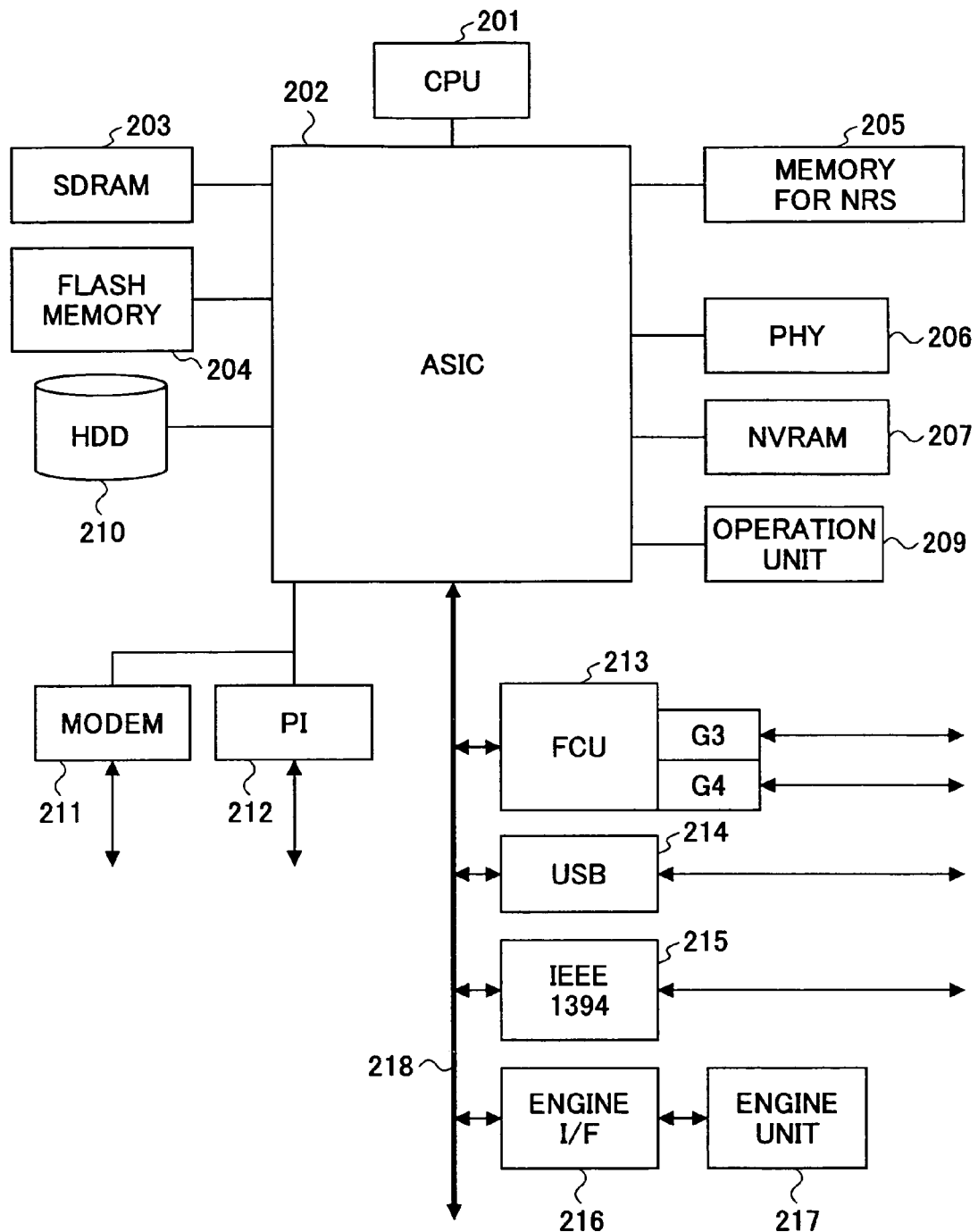
FIG. 7 is a block diagram showing the hardware structure of the image processing device shown in FIG. 3 according to an embodiment.

Referring to FIG. 7, the physical construction of the image processing device 100 shown in FIG. 3 is described below.

FIG. 7 is a block diagram showing the hardware construction of the image processing device 100. The image processing device 100 is a digital multifunctional product that functions as a copier, a printer, a facsimile machine, a scanner, and a document storage apparatus. As shown in FIG. 7, the image processing device 100 includes the following: CPU 201, ASIC (Application Specific Integrated Circuit) 202, SDRAM 203, Flash memory (Non-volatile memory) 204, memory for NRS 205, PHY (physical media interface) 206, NVRAM (Non-volatile memory) 207, operation unit 209, HDD (Hard Disk Drive) 210, modem 211, PI (Personal Interface) 212, FCU (Facsimile Control unit) 213, USB (Universal Serial Bus) 214, IEEE 1394 interface 215, engine interface (I/F) 216, and engine unit 217. Such hardware resources are used for image acquisition, image forming, and the transmission of image information, for example. The engine unit 217 includes multiple engines such as a plotter engine and a scanner engine each having a sensor to detect any abnormal event therein.

The CPU 201 performs processing of various data via the ASIC 202. The ASIC 202 is a multifunctional device having CPU interface, SCRAM interface, local bus interface, PCI bus interface, MAC (Media Access Controller), and HDD interface. Various devices that are controlled by the CPU 201 can share the ASIC 202 such that the efficiency in development of application software and common system services is improved.

The operation unit 209 including an operation panel through which the engine unit 217, for example, is operated and the PHY 206 are directly connected to the ASIC 202. The FCU 213, USB 214, IEEE 1394 I/F 215, and engine I/F 216 are connected to the ASIC 202 via a PCI bus 218. The modem 215 and PI 212 may be connected directly to the ASIC 202.

The SDRAM 203 is main memory used as program memory in which various programs such as the operating system (OS) is stored, and work memory in which working data is temporary stored. DRAM and/or SRAM may be used instead of SDRAM 203.

The flash memory 204 is non-volatile memory used as program memory and fixed parameter memory. For example, boot loader (boot program) that boots the image processing device 100, OS image that is the file of the OS, various application, services, and firmware are stored in the program memory. Various fixed parameters are stored in the fixed parameter memory. The contents of the flash memory 204 is retained even if power is turned off. Instead of this flash memory 204, any suitable non-volatile memory such as battery backed-up RAM and EEPROM can be used. The boot loader may be stored in ROM.

The memory for NRS 205 is non-volatile memory for storing an application program NRS to be described below. NRS function can be optionally added. The NRS may be stored in the flash memory 204 even if the memory for NRS 205 is not provided.

The PHY 206 is interface for communicating with an exterior device through LAN. The PHY 206 may comply with any suitable standard of LAN such as IEEE 802.11b (wireless LAN), IEEE 1394, IEEE 802.3 (Ethernet™).

NVRAM 207 is non-volatile memory for storing the following information: model and type of the image processing device 100, initial values of operations of the operation unit 209, initial values of application programs (APL), counter information (data of charge counter), the setting of the image processing device and the counterpart of communication, and variable parameters, for example. The contents of NVRAM 207 is retained even if power is turned off. NVRAM 207 may be battery backed-up RAM, EEPROM, or flash memory, for example.

The operation unit 209 has various operation keys (referred to as operation switches or operation buttons) through which information and instruction to control the engine unit 217, for example, are input. The operation unit 209 further has a display unit for displaying characters and graphics. The display may be LCD and CRT, for example. The operation unit 209 may have touch panel provided on the display unit.

HDD 210 is a information storage device that can retain data regardless of whether power is turned on or off. The contents of the flash memory 204 and the NVRAM 207 may be stored in HDD 210. Additionally, data that need to be periodically collected, updated, and transmitted may be stored in HDD 210.

Modem 211 can modulate and demodulate data. When the image processing device 100 transmits data to the intermediate apparatus 102 via a public channel, the modem 211 converts the data into a signal that can be transmitted through the public channel. When the image processing device 100 receives modulated data originated from the controlling apparatus 102, the modem 211 demodulates the data.

PI 212 has interface complying with RS 485 standard, and is connected to the public channel through a line adapter (not shown). It is possible to connect the image processing device 100 and the intermediate apparatus 101 via this PI 212.

FCU 213 controls communication with an exterior device such as a facsimile machine, a digital copier and a digital multifunctional product having modem function, and the controlling apparatus 102, for example, via the public channel.

USB 214 and IEEE 1394 I/F 215 are interface meeting USB standard and IEEE 1394 standard, respectively, for communicating with peripheral devices.

Engine I/F 216 is interface for connecting the engine unit 217 to the PCI bus.

The engine unit 217 includes the following units: a scanner engine for scanning the image of documents, a plotter engine for forming an image on a recording medium such as paper based on the image data scanned by the scanner engine or data received from an exterior device, an automatic document feeder (ADF) for automatically feeding and positioning documents to scanning position of the scanner engine, and a post-processing unit, for example, for sorting, punching, and stapling paper on which an image has been formed.

When the image processing device 100 is turned on, the CPU 201 starts boot loader in the flash memory 204 via the ASIC 202, reads the OS image stored in the flash memory 204 using the boot loader, and loads and expands the OS image to the SDRAM 203. Once the OS is expanded, the OS is started. Then, the CPU 201 reads application programs in the flash memory 204 and the NRS application in the memory for NRS 205, loads them to the SDRAM 203, and starts the loaded application programs.

The software configuration of the image processing device 100 is described below with reference to FIG. 8.

Figure 8:
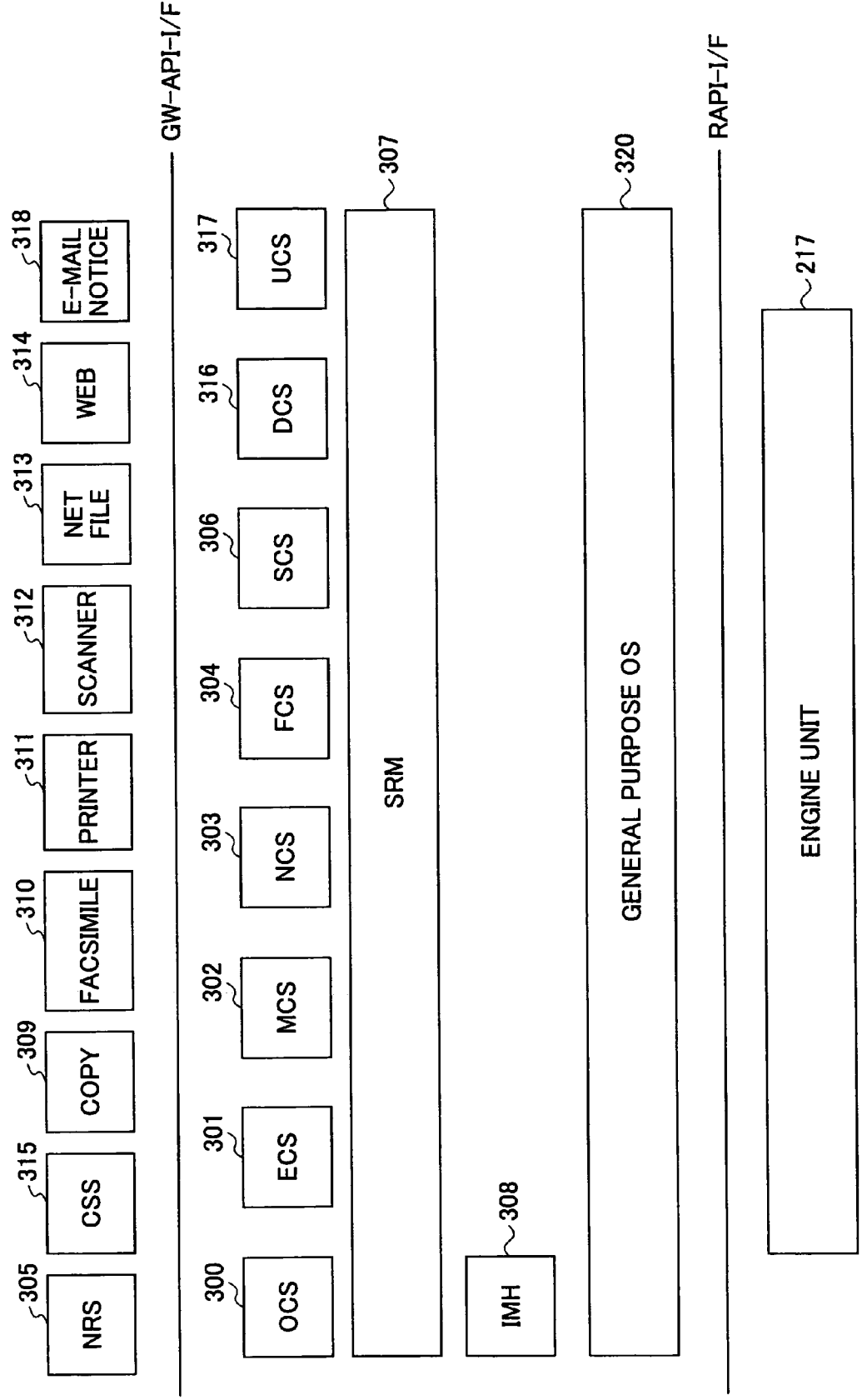
FIG. 8 is a block diagram showing the software configuration of the image processing device according to an embodiment.

FIG. 8 is a block diagram showing an exemplary software configuration of the image processing device 100. As shown in FIG. 8, the software configuration of the image processing device 100 includes an application module layer, a service module layer, and a general-purpose OS layer. Software programs included in the layers are stored in the flash memory 204 or the NRS memory 205. The software programs are retrieved and executed by the CPU 201 when needed. The CPU 201 executes these software programs thereby to realize a communication request transmission unit and a mail transmission unit.

The software programs of the application module layer includes programs for causing the CPU 201 to function as multiple application control units that causes the hardware resources to operate to realize specific functions. The software programs of the service module layer for causing the CPU 201 to function as service control unit that intermediates the hardware resources and the application control units, receives operation requests originated by the multiple application control units to the hardware resources, arbitrates the operation requests, and controls the operation performed based on the operation requests.

It is noted that the image processing device 100 and the image processing device 110 realize the functions related to the communication with the controlling apparatus 102 in different manners. The image processing device 110 is provided with the function of the intermediate apparatus 101, and consequently, realizes the communication function with the controlling apparatus 102 by executing a corresponding software program. However, the image processing device 100 uses the intermediate apparatus 101 as well as executing the corresponding software program to realize the communication function with the controlling apparatus 102.

The service module layer includes the following programs: operation control service (OCS) 300, engine control service (ECS) 301, memory control service (MCS) 302, network control service (NCS) 303, facsimile control service (FCS) 304, system control service (SCS) 306, system solution manager (SRM) 307, image memory handler (IMH) 308, delivery control service (DCS) 316, and user control service (UCS) 317.

The application module layer includes the following programs: NRS application (hereinafter referred to as "NRS") 305, CSS application (hereinafter referred to as "CSS"), copier application 309, facsimile application 310, printer application 311, scanner application 312, net file application 313, web application 314, and mail notice application 318.

The general purpose OS layer includes general purpose OS 320.

These software programs are described below in more detail. OCS 300 is a module for controlling the operation unit 209. ECS 301 is a module for controlling the engine unit 217 such as the hardware resources. MCS 302 is a module for controlling memory. For example, MCS 302 reserves and discharges image memory, and access HDD 2110.

NCS 303 is a module for intermediating the LAN (network) and the application programs of the application module layer. FCS 304 is a module for performing facsimile transmission/reception, facsimile scanning, and facsimile printing, for example. SCS 306 is a module for controlling the start and termination of the application programs of the application module layer in dependence on the contents of a command. SRM 307 is a module for controlling the entire system and resources.

IMH 308 is a module for controlling memory in which image data is temporarily stored. DCS 316 is a module for transmitting and receiving, for example, image files stored in HDD 210, SRAM 203, and NVRAM 207 using Simple Mail Transfer Protocol (SMTP) and File Transfer Protocol (FTP). UCS 317 is a module for controlling user information such as destination addresses and destination names, for example, registered by users.

The copier application 309 is an application program for realizing copy services. The facsimile application 310 is an application program for realizing facsimile services. The printer application 311 is an application program for realizing printer services. The scanner application 312 is an application program for realizing scanner service. The scanner service means the control of scan operation in which the scanner engine reads the image of documents, and image data is stored in the memory (SDRAM 203, NVRAM 207, or HDD 210).

The net file application 313 is an application program for realizing net file service. The web application 314 is an application program for realizing web service. The mail notice application 318 is an application program for realizing mail service according to the present invention.

NRS 305 and CSS 315 are modules each for realizing function (function related to the communication with the controlling apparatus 102) related to remote control using different methods.

The general purpose OS 320 is an operating system such as UNIX (trade mark), Linux (trade mark), Windows (trade mark). The operating system supervises the execution of programs of the service module layer and the application layer. In the case of UNIX and Linux, which are open sources, their source codes are easily available, and the availability of the source codes assures the security of the system.

The internal structure of NRS 305 included in the software configuration of the image processing device 100 is described below with reference to FIG. 9.

Figure 9:
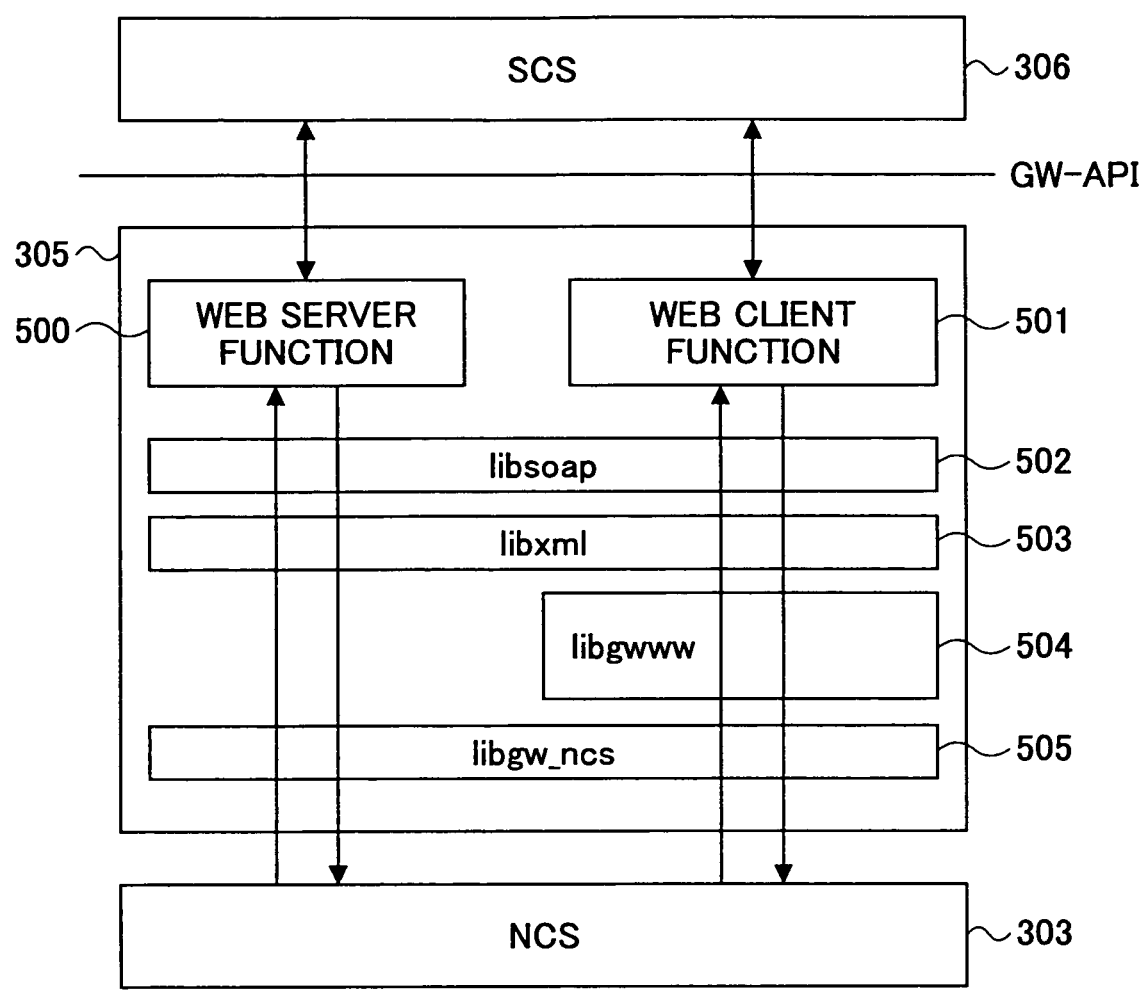
FIG. 9 is a block diagram showing an exemplary function of NRS shown in FIG. 8.

FIG. 9 is a block diagram showing an exemplary configuration of NRS 305. As shown in FIG. 9, NRS 305 operates between SCS 306 and NCS 303. Web server function unit 500 responds to operation requests received form an exterior device.

The operation request is a SOAP request in accordance with Simple Object Access Protocol (SOAP) described in Extensible Markup Language (XML).

Web client function unit 501 issues operation requests to an exterior device.

"libsoap" 502 is a library for processing SOAP. "libxml" 503 is a library for processing data described in XML format. "libgwww" 504 is a library for processing HTTP. "libgw_ncs" 505 is a library for collaborating with NCS 303.

The physical structure of the intermediate apparatus 101 is described below with reference to FIG. 10.

Figure 10:
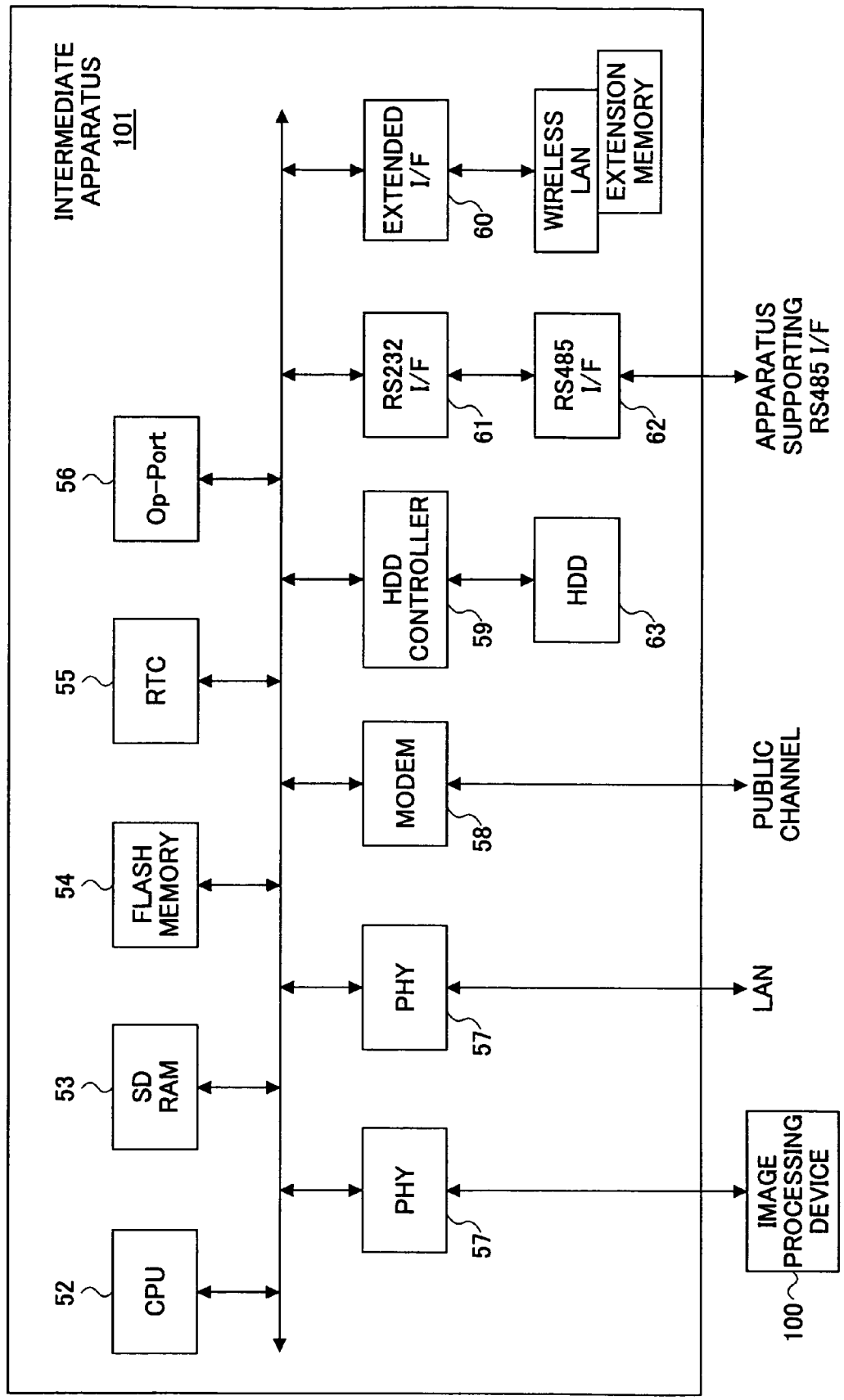
FIG. 10 is a block diagram showing the hardware structure of an intermediate apparatus shown in FIG. 3.

FIG. 10 is a block diagram showing an exemplary hardware structure of the intermediate apparatus 101.

As shown in FIG. 10, the intermediate apparatus 101 includes the following: CPU 52, SDRAM 53, flash memory 54 (non-volatile memory), real-time clock circuit (RTC), operation unit connection port (Op-Port) 56, PHY 57, modem 58, HDD control unit 59, enhanced interface (I/F) 60, RS 232 I/F 61, RS 485 I/F 62, and HDD 63.

The CPU 52 retrieves needed control programs from the memory such as the flash memory 54 and HDD 63, and expands the control programs in the SDRAM 53, for example, and executes the expanded control programs thereby to control the entire system of the intermediate apparatus 101 and realize its communication function according to the present invention.

SDRAM 53 is a main memory used as a program memory for storing various programs including the OS and as a working memory used when the CPU 52 performs data processing.

The flash memory 54 is a non-volatile memory used as a program memory for storing the boot loader (boot program) for starting the intermediate apparatus 101, the OS image that is the file of OS, and various programs to be described below, and as a parameter memory for storing various fixed parameters and various changeable parameters (the IP address of the proxy server, the login name of the proxy server, the login password of the proxy server, and the center URL, for example). The flash memory 54 can retain its contents even if the power is turned off. Similar data can be stored in the HDD 63.

RTC 55 is a circuit for measuring time. Op-Port 56 is a circuit for detecting an operation made to an operation unit (not shown).

PHY 57, the modem 58, RS 485 I/F 62 are interface units for communicating through LAN, the public channel, and RS 485 standard serial channel.

The extension I/F 60 is an interface for connecting an extension board such as a wireless LAN board or an extension memory.

This intermediate apparatus 101 is connected to the image processing device 100 on the LAN via PHY 57, and further connected to the Internet 103. The intermediate apparatus 101 can be connected to the image processing device 100 via RS 232 I/F 61 and RS 485 I/F 62. DRAM or SRAM may be used instead of SDRAM 53. Another suitable non-volatile memory may be used instead of EEPROM.

The physical structure of the controlling apparatus 102 is described with reference to FIG. 11.

Figure 11:
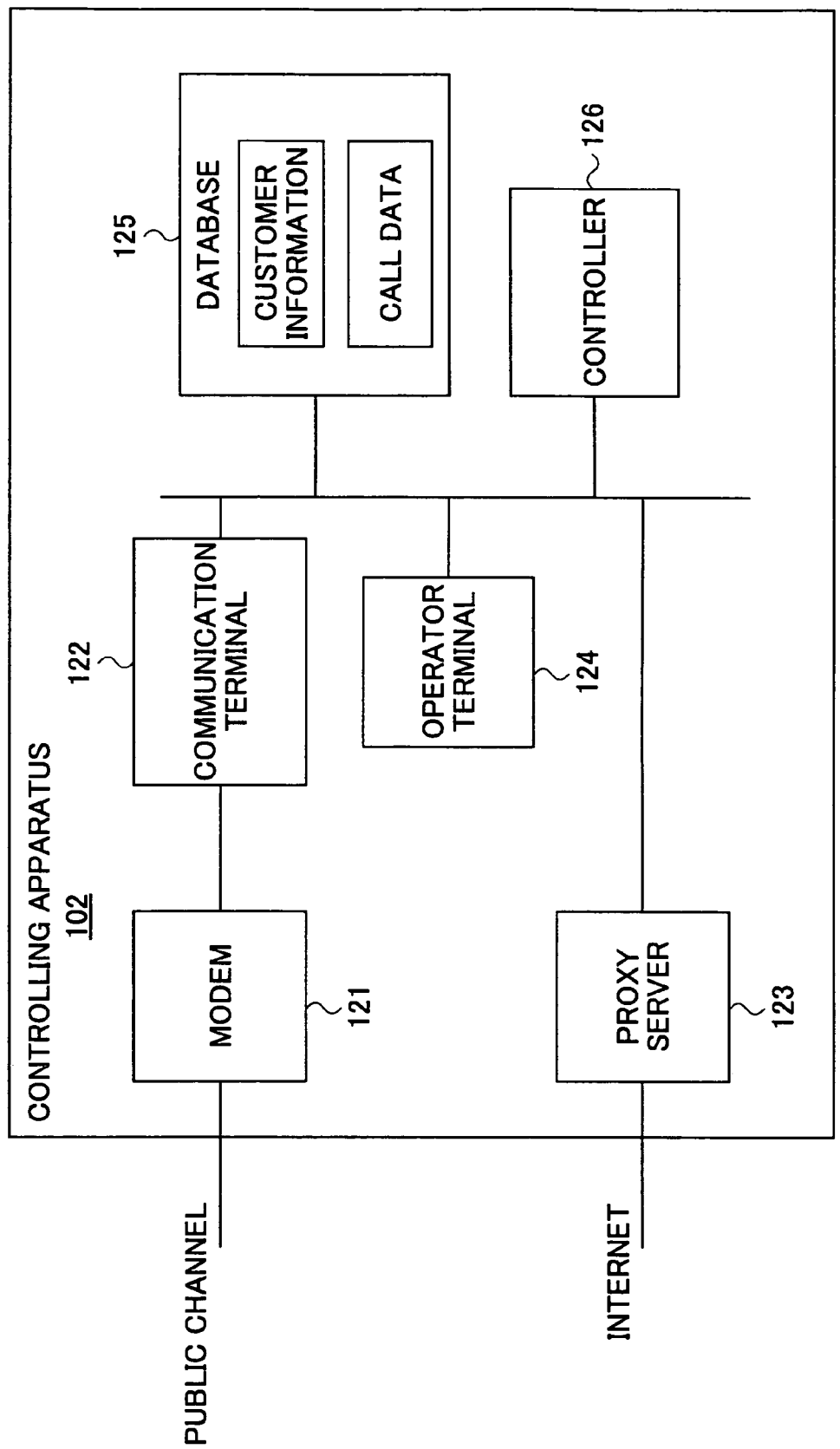
FIG. 11 is a block diagram showing an exemplary structure of a controlling apparatus shown in FIG. 3.

FIG. 11 is a block diagram showing an exemplary structure of the controlling apparatus 102.

The controlling apparatus 102 includes a modem 121, a communication terminal 122, a proxy server 123, an operator terminal 124, a database 125, and a control unit 126, for example.

The modem 121 controls the communication with the intermediate apparatus 101 of the user (the user using the image processing device, for example), line adaptor, and the image processing device 110, and modulates and demodulates data to be exchanged. This modem 121 and the communication terminal 122 collectively operate as a communication unit.

The communication terminal 122 controls the communication through the modem 121.

The proxy server 123 performs the communication with the intermediate apparatus 101 at the user side and security management via the Internet. This proxy server 123 also function as a communication unit.

The operator terminal 124 is a terminal apparatus (a personal computer, for example) that a center operator who is the operator of the controlling apparatus 102 in the service center operates. The operator terminal is provided various input data through the operation of an input device such as a keyboard and/or a pointing device (a mouse, for example) by the center operator, and displays information of which the center operator needs to be informed on a display unit such as an LCD and/or a CRT display. An example of data that is input to the operator terminal includes customer information such as an IP address and a phone number to be called when communicating with the intermediate apparatus 101, the image processing device 110, and the line adaptor at the apparatus user side, for example.

The database 125 is stored in a storage unit such as a hard disk drive of a data base server (not shown), and stores various data such as the IP address and the phone number of the intermediate apparatus 101 and the image processing device 110, data of abnormal events received from those apparatuses, and data input by the operator terminal 124, for example.

The controlling apparatus 126 is provided with a micro computer including CPU, ROM, and RAM (not shown), for example, and centrally control the entire controlling apparatus 102. The CPU executes control programs stored in ROM, for example, if necessary, and uses the modem 121, the communication terminal 122, the proxy server. 123, the operator terminal 124, or the database 125. That is, the CPU operates as a communication control unit according to the present invention.

The structure of the controlling apparatus 102 is not limited to the structure described above. The controlling apparatus may be an information processing apparatus such as a personal computer.

An exemplary communication sequence in which data is exchanged in the image processing device remote control system shown in FIG. 3 is described based on the above structures. Although processing is performed by the CPU 201 operating in accordance with a program, it may be described in the following description that processing is performed by the program to make the description easy to understand.

Figure 12:
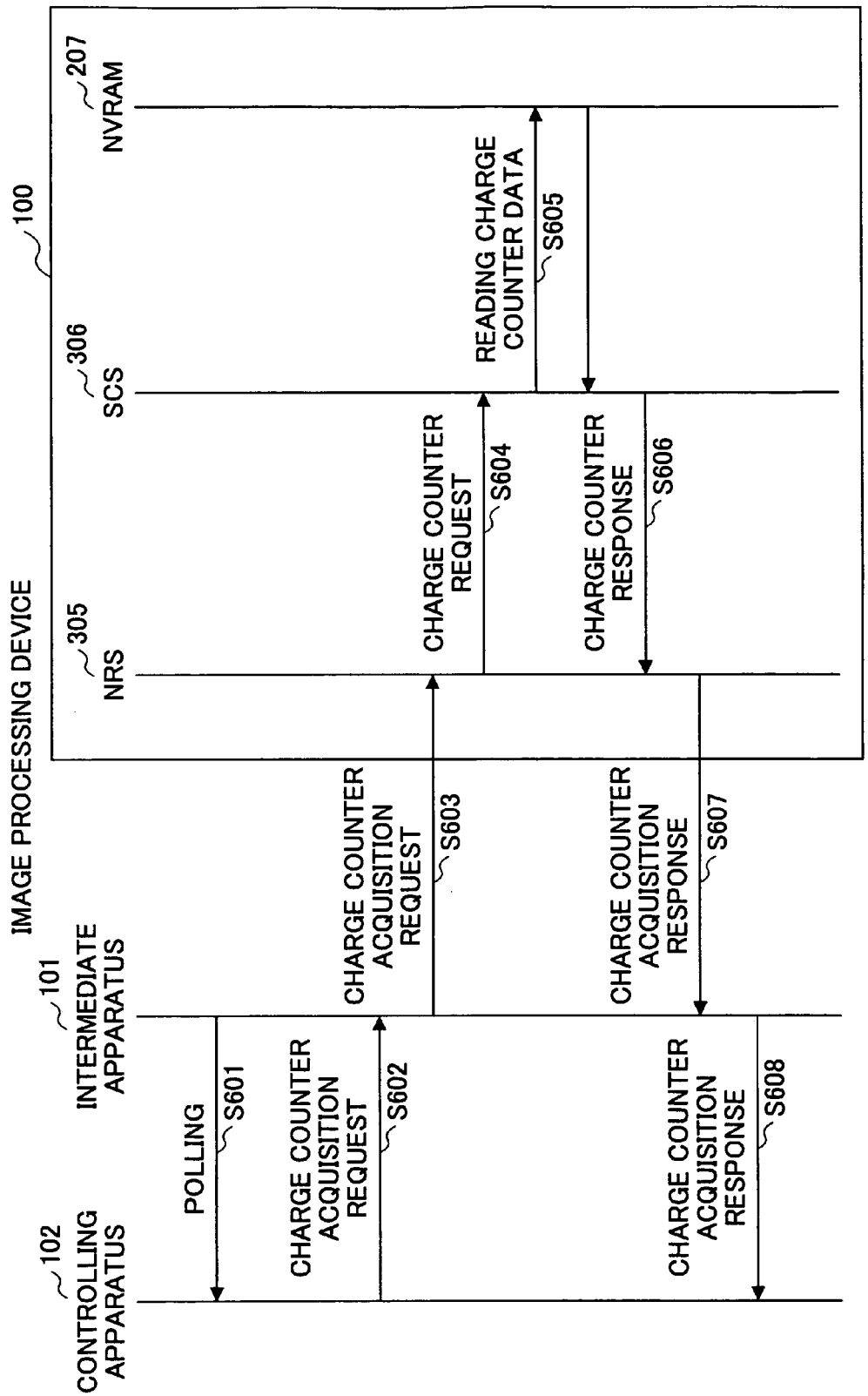
FIG. 12 is a sequence diagram showing an exemplary communication sequence for explaining data exchange in the remote control system of image processing devices shown in FIG. 3.

FIG. 12 is a sequence diagram showing the communication between the controlling apparatus 102, the intermediate apparatus 101, and the image processing device 100 shown in FIG. 3.

The intermediate apparatus 101 periodically transmits a predetermined HTTP request (HTTP request including no SOAP request) to the controlling apparatus via the Internet 103. This predetermined HTTP request may be referred to as a periodic HTTP request. As shown in FIG. 3, because the firewall 104 is provided between the intermediate apparatus 101 and the controlling apparatus 102, the controlling apparatus 102 cannot establish a communication session to the intermediate apparatus 101. If the controlling apparatus 102 requires to transmit a request to the intermediate apparatus 101 (or the image processing device 100 via the intermediate apparatus 101), the controlling apparatus 102 needs to wait for the periodic HTTP request from the intermediate apparatus 101. If there is no firewall 104, or the firewall 104 is set to allow communication from an external device, the intermediate apparatus 101 does not need to issue the periodic HTTP request.

When the controlling apparatus 102 needs to acquire the charge counter (corresponding to total counter count) of an image processing device 100, the controlling apparatus 102 generates a HTTP response containing a SOAP request requesting the acquisition of the charge counter. The controlling apparatus 102 converts the charge counter acquisition request into XML format that is structured language format, and contains the converted request in the SOAP request. When the controlling apparatus 102 receives the periodic HTTP request from the intermediate apparatus 101 (to which the image processing device 100 of which charge counter needs to be acquired) (S601), the controlling apparatus 102 transmits the HTTP response containing the generated SOAP request requesting the acquisition of the charge counter to the intermediate apparatus 104 via the Internet (S602). Thus, even the controlling apparatus 102 outside the firewall 104 can transmit a request as a HTTP response to the HTTP request originated by the intermediate apparatus inside the firewall 104.

In response to receipt of the HTTP response containing the SOAP request requesting the acquisition of the charge counter from the controlling apparatus 102, the intermediate apparatus 101 generates a HTTP request containing the SOAP request, and transmits the HTTP request to the image processing device 100 the charge counter of which needs to be acquired (S603).

When NCS 303 of the image processing device 100 receives the HTTP request containing the SOAP request requesting for the acquisition of charge counter from the intermediate apparatus 101, NRS 305 of the image processing device 100 transmits the charge counter acquisition request containing in the SOAP request to SCS 306 (S604).

NCS 303 can operate as a HTTP client and a HTTP server. NCS 303 can receive the HTTP request (or HTTP response) transmitted by the intermediate apparatus 101, and transfer the SOAP request (SOAP response) contained in the HTTP request to NRS 305. Further, in response to receipt of a SOAP response (SOAP request) transmitted by NRS 305, NCS 303 contains the SOAP response in a HTTP response (or HTTP request), and transmit the HTTP response to the intermediate apparatus 101.

In response to receipt of the charge counter acquisition request from NRS 305, SCS 306 reads count (total counter count) of the charge counter stored in NVRAM 207, for example (S605). Then, SCS 306 transfers the count of the charge counter to NRS 305 as a charge counter acquisition response (S606).

In response to receipt of the charge counter acquisition response, NRS 305 generates a SOAP response containing a charge counter acquisition response. That is, the charge counter acquisition response is converted into XML format that is structured language format, and is contained in the SOAP response. NRS 305 transmits the generated SOAP response containing the charge counter acquisition response to NCS 303. NCS 303 converts the received SOAP response from NRS 305 into a HTTP response, and transmits the HTTP response to the intermediate apparatus 101 via the LAN (S607).

In response to receipt of the HTTP response containing the SOAP response of the charge counter acquisition response from the image processing device, the intermediate apparatus transmits the HTTP response to the controlling apparatus 102 via the Internet 103 (S608).

Next, an exemplary communication sequence in which data is transmitted from the image processing device 100 to the controlling apparatus 102 via the intermediate apparatus 101 is described with reference to FIG. 13.

FIG. 13 is a sequence diagram showing the transmission of data from the image processing device 100 to the controlling apparatus 102.

OCS 300 of the image processing device 100 informs SCS 306 that a user call key (not shown) of the operation unit 209 has been pressed (S701).

In response to receipt of the information that the user call key of the operation unit 209 has been pressed from OCS 300, SCS 306 transmits a user call issuance request (S702). The identification information of the image processing device such as its model and number is attached to the user call issuance request. Additionally, the contents of the user call is stored in NVRAM 207, for example.

In response to receipt of the user call issuance request from SCS 306, NRS 305 generates a SOAP request of the user call, and transmits a transmission request containing the SOAP request to NCS 303. NCS 303 contains the SOAP request in a HTTP request, and transmits the HTTP request to the intermediate apparatus 101 via the LAN (S703).

In response to receipt of the HTTP request containing the SOAP request of the user call from the image processing device 100 (the user call key of which has been pressed), the intermediate apparatus 101 attaches its own identification information to the SOAP request, generates a HTTP request containing the SOAP request, and performs user call to the controlling apparatus 102 via the Internet (S704). Usually, the HTTP request containing the SOAP request of the user call and the identification information is transmitted to the controlling apparatus 102 via the Internet 103.

In this case, because this transmission is directed from the inside of the firewall 104 to the outside thereof, the intermediate apparatus 101 can establish communication session with the controlling apparatus 102.

Three patterns (A)-(C) after step S704 is described below.

In the case of the pattern (A), the controlling apparatus 102 receives the HTTP request containing the SOAP request of the user call from the intermediate apparatus 101, and generates a HTTP response containing a SOAP response indicating whether the user call has been successfully received or not, and transmits the HTTP response to the intermediate apparatus 101 via the Internet 103 (S705). That is, if the receipt of the HTTP request has been normally completed, the SOAP response indicates that the user call has been successful and, if the receipt of the HTTP request has not been normally completed, the SOAP response indicates that the user call has been unsuccessful (information identifying the reason of failure such as the malfunction of the controlling apparatus 102 is attached).

If the intermediate apparatus 101 receives the HTTP response containing the SOAP response of the user call result from the controlling apparatus 102 until a predetermined time period passes from the transmission of the HTTP request containing the SOAP request of the user call to the controlling apparatus 102, the intermediate apparatus 101 transmit the HTTP response to the image processing device 100 via the LAN (S706). Even in the case in which a HTTP response containing a SOAP response indicating the user call result, if the SOAP response indicates that the user call has been unsuccessful, the SOAP response is considered not to be normal response.

When NCS 303 receives the HTTP response containing the SOAP response of the user call result (when NRS 305 receives the SOAP response of the user call result from NCS 303), NRS 305 transmits the user call result contained in the SOAP response to SCS 306 (S707).

In response to receipt of the call result, SCS 306 transmits the call result to OCS 300, and attaches the contents of the call result to the user call stored in NVRAM 207, for example. If the call result indicates the failure of the user call, the reason of the failure is also stored in NVRAM 207. The reason of the failure of the user call can be determined based on the contents of the call result. For example, information for identifying the reason of failure attached to the call result indicates that the failure is caused by the malfunction of the controlling apparatus 102 in the service center, the reason of the failure can be identified as the malfunction of the controlling apparatus 102.

An example of the malfunction of the controlling apparatus 102 includes that the proxy server 123 has not been working.

In response to receipt of the call result from SCS 306, OCS 300 displays a message indicating the contents of the call result on the operation unit 209 (S708).

In the case of the pattern (B), if the intermediate apparatus 101 can not receive a HTTP response from the controlling apparatus 102 until a predetermined time passes after the transmission of the HTTP request containing the SOAP request of the user call to the controlling apparatus 102 (including the case in which the intermediate apparatus 101 can not receive a normal SOAP response to the SOAP request of the user call to the controlling apparatus 102), the intermediate apparatus 101 detects time out, generates a HTTP response containing a SOAP response of the call result indicating that the user call has been unsuccessful (information for identifying the reason of the failure such that the intermediate apparatus 101 has detected the time out), and transmits the HTTP response to the image processing device 100 (the user call key of which has been pressed) via the LAN (S709).

When NCS 303 receives the HTTP response containing the SOAP response of the call result from the intermediate apparatus 101, NRS of the image processing device 100 transmits the call result contained in the SOAP response to SCS 306 (S710).

In response to receipt of the call result from NRS 305, SCS 306 transfer the call result to OCS 300, and attaches the contents of the call result to the user call stored in NVRAM 207. Because the call result indicates the failure of the user call, the reason of the failure is stored in NVRAM 207. The reason of the failure of the user call can be identified based on the contents of the call result. For example, the information attached to the call result for identifying the reason of the failure is that the intermediate apparatus 101 has detected time out, the reason of the failure can be identified as any problem on the communication path between the intermediate apparatus 101 and the controlling apparatus 102, or as the service center has been closed.

An example of the problem includes improper setting of the proxy of the intermediate apparatus 101 (mistakes made in setting of the login name and password of proxy server) and the stop of operation of proxy server (firewall 104).

In response to receipt of the call result from SCS 306, OCS 300 displays a message indicating the contents of the call request on the operation unit 209 (S711).

In the case of the pattern (C), if NCS 303 does not receive the HTTP response containing the SOAP response of the call result from the intermediate apparatus 101 (if NRS 305 does not receive the SOAP response of the call result from NCS 303) until a predetermined time period passes after NCS 303 transmits the HTTP request containing the SOAP request of the user call, NRS 305 detects time out and determines that the user call has failed. NRS 305 transmits the call result indicating that the user call has failed to SCS 306 with information with which the reason of failure can be identified such that NRS 305 has detected time out, for example (step S712)

In response to receipt of the call result, SCS 306 transmits the call result to OCS 300, and includes the contents of the call result in the contents of the user call stored in NVRAM 207. Since the contents of the call result indicates the failure of the user call, the reason of the failure is also stored in NVRAM 207. The reason of the failure can be identified from the contents of the call result. For example, if the information for identifying the reason of failure attached to the call result indicates that NRS 305 has detected time out, the reason of failure can be identified as the failure on the communication path between the image processing device 100 and the intermediate apparatus 101.

An example of the failure may include the disconnection of LAN cable between the image processing device 100 and the intermediate apparatus 101, and the stop of the operation of the intermediate apparatus.

If the intermediate apparatus 101 is not provided with above function to detect time out (in the case in which the intermediate apparatus 101 can not generate a HTTP response including the SOAP response of the call result indicating the failure of the user call, and transmit the HTTP to the image processing device 100), SCS 306 can not determine that the failure of the user call has been caused by the failure in the communication path between the image processing device 100 and the intermediate apparatus 101. In this case, SCS 306 can identify the reason of the failure to be the failure in the communication path between the image processing device 100 and the intermediate apparatus 102.

In response to receipt of the call result from SCS 306, OCS 300 displays a message indicating the contents of the call result on the display unit of the operation unit 209 (S713).

The case is described above in which the intermediate apparatus 101 sends a HTTP request so that the controlling apparatus 102 can transmit data to the intermediate apparatus 101 as a HTTP response to the HTTP request through the firewall 104. The transmission of data through the firewall 104 can be realized in different manners. For example, the controlling apparatus 102 can transmit data to be sent to the intermediate apparatus 101 as an e-mail message or the attachment to an e-mail message using Simple Mail Transfer Protocol (SMTP). However, HTTP is superior to SMTP in reliability.

Processing of a user call has been described above. A SC call and a supply call can be treated in the similar manner. Processing of these calls includes the transmission of an e-mail message, which is described below in detail.

In the image processing device 100, the CPU 201 controlling the hardware resources such as the engine unit 217 and the operation unit 209 monitors the state of each hardware resource, detects the occurrence of predetermined events such as any abnormal operation of the hardware resource, and performs different procedures in dependence on the type of the predetermined event. Information is required that can be used as a reference for identifying the type of an event. FIG. 14 shows the data structure of an exemplary table indicating information (reference information) that can be used as a reference for identifying the type of an event (abnormality). "Serviceperson call (SC)" is an example of "abnormality". As shown in FIG. 14, the type of the detected SC is determined based on the detected SC. Each type is described below.

"Type A" is a Serviceperson Call (SC) indicating a state of the system in which the indication of SC is displayed on the operation unit and the system is prohibited from being used, and from which the user can not discharge the system. The system in type A SC can not be reset by the controlling apparatus using "SC reset". The user can not discharge the system in type A SC by turning off and on the main switch to switch the main power supply or by turning off and on the soft power supply switch to switch the power supply to the engine unit. An example of this type is SC occurred in the fixing system.

"Type B" is a SC indicating a state of the system in which only one or more functions that are detected to be abnormal are prohibited from being used. The indication of SC is displayed on the operation unit 209, only when the one or more functions that are detected to be abnormal are selected, the indication of SC is displayed on the operation unit 209. An example of type B SC includes the case in which duplex printing mode is selected when a duplex printing unit is in trouble.

"Type C" is a SC indicating a state of the system in which the indication of SC is not displayed on the operation unit 209 even an abnormal event occurs, but the occurrence of an abnormal event is logged. An example of type C SC includes the failure of communication.

"Type D" is a SC indicating a state of the system in which the indication of SC is displayed on the operation unit 209 and the system is prohibited from being used. The user can discharge the system from the type D SC by turning off and on the main switch to switch the main power supply or by turning off and on the soft power supply switch to switch the power supply to the engine unit 217. However, if abnormality is detected after turning on the main switch or the soft power supply switch, the system is not discharged from the type D SC. An example of the type D SC includes the malfunction of a motor.

The above reference information may be stored in a predetermined memory area of the NVRAM 207 or HDD 210. SC's occurred in different unit such as the scanner engine and the plotter engine may be treated as different events.

Processing by the image processing device 100, the intermediate apparatus 101, and the controlled apparatus 102 is described below in detail with reference to FIGS. 15-30. Since processing performed by the image processing device 110 is identical to processing performed by the image processing device 100 and the intermediate apparatus 101, the description of processing performed by the image processing device 110 is omitted.

Figure 15:
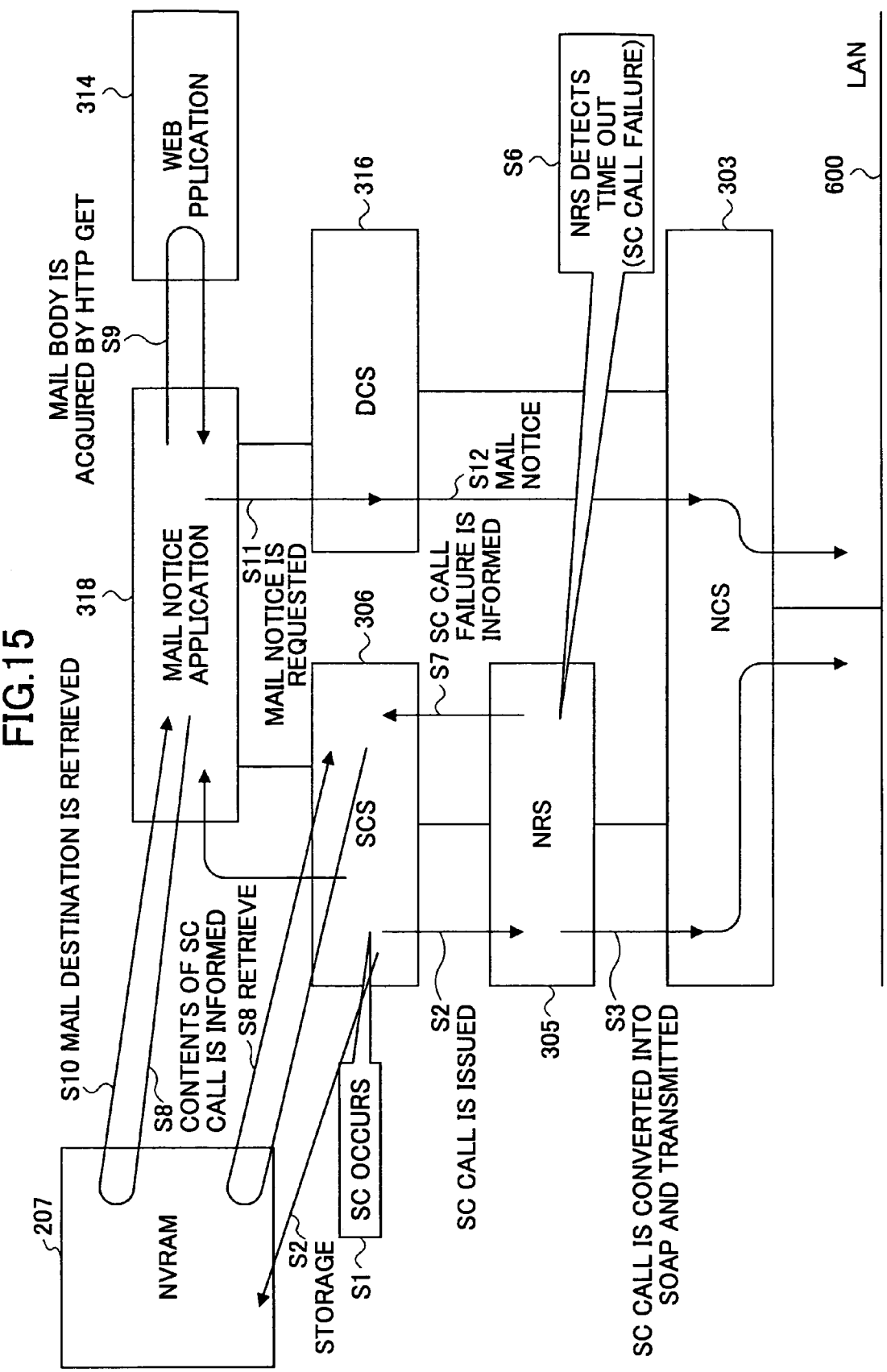
FIG. 15 is a schematic diagram showing software programs and an exemplary flow related to a SC call of the image processing device of FIG. 3.

FIG. 15 is a schematic diagram showing the software programs of the image processing device 100 and the flow of process related to the SC call.

FIG. 16 is a schematic diagram showing various apparatuses included in the image processing device remote control system and the flow of process related to the SC call. Step numbers shown in FIGS. 15 and 16 correspond to step numbers shown in FIG. 27.

In the following description, an assumption is made that the intermediate apparatus 101 is not provided with function for detecting time out.

As shown in FIG. 15, in the image processing device 100, if any trouble (SC) occurs in the engine units such as the plotter engine and the scanner engine, the trouble is detected by a sensor (trouble detection unit), and information of the trouble (SC) is sent to SCS 306 (step S1).

In response to receipt of the information of SC from one of the engine units, SCS 306 detects the SC, discriminates the contents of the SC (the type and number of the SC), and sends a request for issuing SC call (issuance request) to NRS 305 (step S2). SCS 306 attaches the contents of SC and the model and device number of the image processing device as the identification information of the image processing device to the issuance request. The contents of the SC call is stored in NVRAM 207 or HDD 210.

The contents of the SC call and the call result stored in NVRAM 207 when the SC call (trouble notice) is issued are described with reference to FIG. 17.

FIG. 17 shows exemplary contents of a SC call and an exemplary call result stored in NVRAM 207 according to an embodiment.

As shown in FIG. 17, call type is "SC call", SC number is "120", and the call result is "center failure". The call type "SC call" and the SC number "120" indicate the contents of the SC call. The call result "center failure" indicates that the SC call has failed due to trouble occurred in the controlling apparatus 102 of the service center. The call result is stored in the NVRAM 207 when the call result is informed, instead of immediately after the SC call is issued (the call result is attached to the contents of the SC call that has already been stored). This process is described below in detail.

The contents of a supply call and its result stored in NVRAM 207 is described below with reference to FIG. 18.

FIG. 18 shows exemplary contents of the supply call and the result of the supply call stored in NVRAM 207.

As shown in FIG. 18, the event type is "supply call", event supply kind is "toner", and call result is "communication pass failure". The event type "supply call" and the event supply kind "toner" indicate the contents of the supply call. The call result "communication path failure" indicates that the supply call has failed due to trouble in the communication path between the intermediate apparatus and the controlling apparatus 102 or trouble in the communication path between the image processing device 100 and the intermediate apparatus 101. This call result is also stored in NVRAM 207 when the call result is informed instead of immediately after the issuance of the supply call.

Further description of FIGS. 15 and 16 is made below. In response to receipt of a request for issuing a SC call from SCS 306, NRS 305 generates a SOAP request of the SC call (including the contents and device number of the SC attached to the request for issuing the SC call), and requests NCS 303 to send the SOAP request. NCS 303 converts the SOAP request into a HTTP request, and transmits the HTTP request containing the SOAP request of the SC call to the intermediate apparatus 101 via LAN 600 (step S3, S4).

In response to receipt of the HTTP request containing the SOAP request of the SC call from the image processing device 100, the intermediate apparatus 101 attaches its own identification information to the received SOAP request, generates a HTTP request containing the received SOAP request, and makes a user call to the controlling apparatus 102 via the Internet 103. In this case, the HTTP request containing the SOAP request of the SC call to which the identification information of the intermediate apparatus 101 is attached is transmitted to the controlling apparatus 102 via the Internet 103 using format as shown in FIG. 21.

The format of the SOAP request of the SC call (excluding the identification information of the intermediate apparatus 101) is described below with reference to FIGS. 21 and 22.

FIG. 21 shows exemplary format of the SOAP request of the SC call (excluding the identification information of the intermediate apparatus 101), and FIG. 22 shows the main portion (data) of the format.

As shown in FIGS. 21 and 22, the SOAP request of the SC call includes device ID for identifying the image processing device 100 at which the SC has occurred, call type indicating the call is a SC call, call ID for identifying the call, and information indicating the details of the call such as SC number (in the case of supply call, the kind of supply such as toner). Although not shown, information such as the jam, SC, status, counter counts, and log of the image processing device 100 can be included as well. Since the SC number is different trouble by trouble (SC by SC), the SOAP message of the SC call is different trouble by trouble.

If the controlling apparatus 102 know the corresponding relation between the SC number and SC type, the controlling apparatus 102 can determine the SC type using the SC number as a key. However, the SC type may be included in the SOAP request of the SC call.

The description of FIGS. 15 and 16 is continued below.

The controlling apparatus receives the HTTP request containing the SOAP request of the SC call from the intermediate 101. If the reception has been completed successfully, the controlling apparatus generates a HTTP response containing the SOAP response of the call result indicating that the SC call has been successful, and transmits the HTTP response to the intermediate apparatus 101 via the Internet 103. If the reception has not been completed successfully, the controlling apparatus generates a HTTP response containing the SOAP response of the call result indicating that the SC call has been unsuccessful, and transmits the HTTP response to the intermediate apparatus 101 via the Internet 103.

If the intermediate apparatus 101 receives the HTTP response containing the SOAP response of the call result from the controlling apparatus 102 to the HTTP request containing the SOAP request of the SC call, the intermediate apparatus 101 transmits the HTTP response to the image processing device 100 via the LAN 600. If the HTTP response containing the SOAP response of the call result is received, but the SOAP response indicates that the SC call has failed, the SOAP response is not considered as being normal.

In response to receipt of the HTTP response containing the SOAP response of the call result from the intermediate apparatus 101, NCS 303 of the image processing device 100 sends the SOAP response.

If NRS 305 of the image processing device 100 receives a SOAP response of the call result from NCS 303 before a predetermined time period passes after NRS 305 transmits a request for transmitting the SOAP request of the SC call to NCS 303, NRS 305 sends the call result contained in the SOAP response to SCS 306. NRS 305 also sends the contents of the SC call contained in the SOAP body of the SOAP request of the SC call sent to NCS 303 to SCS 306 as its entirety. However, the SOAP body may not necessarily transmitted as its entirety.

If the HTTP request containing the SOAP request of SC call is blocked by the firewall 104 (proxy server) due to trouble in the communication path due to improper setting of proxy, for example (step S5), NRS 305 can not receive the SOAP response of the call result from NCS 303 even if the predetermined time has passed (time out) after the request for transmission is sent to NCS 303. In this case, NRS 305 recognizes the failure of the SC call by detecting time out, and sends the call result indicating the failure (with information for identifying the result of the failure) to SCS 306 (step S7). At the same time, NRS 305 transmits the contents of the SC call contained in the SOAP body of the SOAP request sent to NCS 303 to SCS 306 as its entirety. Even if a communication error occurs in which the HTTP request containing the SOAP request of SC call is blocked by the intermediate apparatus 101 due to trouble in the communication path due to the stop of operation of the intermediate apparatus 101 and the disconnection of LAN cable between the intermediate apparatus and the image processing device 100, NRS 305 can detect time out in the same manner as above.

In the case in which the intermediate apparatus 101 is provided with function for detecting time out, if the intermediate apparatus 101 does not receive the HTTP response from the controlling apparatus 102 before a predetermined time period passes after the transmission of the HTTP request containing the SOAP request of SC call to the controlling apparatus 102 (if the intermediate apparatus 101 does not receive normal SOAP response to the SOAP request of the user call to the controlling apparatus 102), the intermediate apparatus 101 detects the failure of SC call, generates a HTTP response containing a SOAP response indicating the failure of SC call, and transmit the HTTP request to the image processing device 100 via the LAN 600. (Information for identifying the reason of the failure such as time out being detected by the intermediate apparatus 101 is attached.)

In response to receipt of the HTTP response containing the SOAP response of call result from the intermediate apparatus 101, NCS 303 of the image processing device 100 sends the SOAP response to NRS 305.

In response to receipt of the SOAP response of the call result form NCS 303, NRS 305 sends the call result contained in the SOAP response to SCS 306. NRS 305 may sends the contents of the SC call contained in the SOAP body of the SOAP request sent to NCS 303 in its entirety, or may attach the call result contained in the SOAP response to the SOAP message. However, the transmission of the SOAP message does not necessarily performed.

In response to receipt of the call result and the SOAP message from NRS 305, SCS 306 attaches the information indicating whether the SC call is successful or unsuccessful (if unsuccessful, the reason of failure identified from the information for identifying the reason of failure is also attached) to the contents of the SC call stored in NVRAM 207 (see FIG. 17), reads the contents of the SC call, and sends the contents of the SC call to the mail notice application 318 with the SOAP message (step S8).

In response to receipt of the contents of the SC call and the SOAP message from SCS 306, the mail notice application 318 determines whether the contents of the SC call now received is to be notified by e-mail based on the call result contained in the contents of the SC call and data stored in NVRAM 207 (the contents of setting related to mail notice).

The contents of setting related to mail notice stored in NVRAM 207 is described with reference to FIGS. 23 and 24.

FIG. 23 is a diagram showing an example of the contents of setting related to mail notice stored in NVRAM 207.

The contents of setting related to the mail notice has a mail event type, mail notice effective/ineffective setting, and destination of mail.

In this example, the mail event type includes SC call success, SC call out of business hour, SC call failure (due to center trouble), SC call failure (due to communication path trouble), supply call success, supply call failure (due to center trouble), supply call failure (due to communication path trouble), line disconnected.

For each mail event, it is possible to set independently whether the mail notice is effective or ineffective, and one or more destinations (administrator, general affairs personnel, and IT personnel).

In the case of SC call out of business hour, SC call failure (due to center trouble), SC call failure (due to communication path trouble), supply call failure (due to center trouble), supply call failure (due to communication path trouble), and line disconnected, default setting is that mail notice is effective in order to perform the mail notice. If mail notice is set effective for the cases of the call failures and line disconnected, the center (the controlling apparatus 102) is included in the destination so that mail notice is surely performed to the controlling apparatus 102. Multiple destination groups may be set for each mail event, and can be stored in NVRAM 207.

FIG. 24 is a diagram showing the contents of setting of the multiple destination groups (remaining portion of the contents of setting related to the mail notice stored in NVRAM 207).

Each destination group includes destination group number, destination group name, and destinations. The default destination group names are group 1-4, but they may be renamed at user's discretion. In this case, they are renamed as administrator, general affairs personnel, and IT personnel. Each destination group (administrator, general affairs personnel, IT personnel) can include multiple destination addresses. However, only one address per destination group can be designated upon mail notice. As described above, in the case of the call failures and line disconnection, the center address is set to the destination group "5" as default value in order to ensure the controlling apparatus 102 to receive the mail notice. Default setting may be applied to other destination default number. The destination groups can be increased in number.

The description of FIGS. 15 and 16 continues below.

If the contents of the SC call now received is subject to mail notice (mail notice is set effective), SCS operates as follows.

SCS 306 acquires mail body corresponding to the contents of the SC call received from SCS 306 from the URL for generating mail body of the web application 314 corresponding to a local host using HTTP-GET in order to generate mail body (step S9).

The URL for generating the mail body is described below with reference to FIGS. 19 and 20.

FIG. 19 is a diagram showing an example of URL for generating mail body through which the mail notice application 318 acquires e-mail body (hereinafter referred to as "mail") from the web application 314 (Websys) when the SC call has failed.

In this URL, "127.0.0.1" indicates a local host which is set in the mail notice application 318 in advance. "127.0.0.1" may be written as "local host". "event_type= NRS_ML_SC_CENTER_FAILURE&event_sc_no=120" indicates the contents of the SC call and the call result (center failure) described with reference to FIG. 17.

FIG. 20 is a diagram showing an example of URL from which the mail notice application 318 acquires mail body from the web application 314 when the supply call has failed. "NRS_ML_SUPPLY_COMMUNICATION_PATH_FAIL-URE&event_supply_kind=TONER" in this URL indicates the contents of the supply call and the call result (communication path failure) described with respect to FIG. 18.

The acquisition of URL for generating mail body is described in more detail below.

The mail notice application 318 generates URL for generating mail body as described in FIG. 19 based on the contents (including the call result) of the SC call received from SCS 306, and transmits the URL to the web application 314 using HTTP-GET command. In response to receipt of the URL for generating mail body using the HTTP-GET command, the web application 314 acquires corresponding page information from the URL as mail body, and transmits the mail body to the mail notice application 318. Thus, the mail notice application 318 can acquire mail body corresponding to the contents of the SC call received from SCS 306.

FIG. 25 is a diagram showing an example of mail body in text format according to an embodiment.

FIG. 26 is a diagram showing an example of mail body in XML format according to an embodiment.

If the mail notice application 318 has received the SOAP message as well as the contents of the SC call from SCS 306, the mail notice application 318 can paste the SOAP message to the mail body of XML format. It is preferable to transmit the mail body in XML format because the controlling apparatus 102 can process it.

The description with respect to FIGS. 15 and 16 is continued.

After acquiring the page information corresponding to the contents of the SC call received from SCS 306 as the mail body, acquires the address of corresponding mail destination from NVRAM 207 (step S10), and sends a request for mail notice to DCS 316 (step S11). The mail notice application 318 attaches the acquired address of the mail destination and the mail body to the mail notice request.

In response to receipt of the mail notice request from the mail notice application 318, DCS 316 sends the mail notice to NCS 303 (step S12). DCS 316 sends the address of the mail notice destination and the mail body attached to the mail notice request to NCS 303.

NCS 303 transmits an e-mail containing the address of the mail notice destination and the mail body received from DCS 316 to Simple Mail Transfer Protocol (SMTP) server 601 via LAN 600.

If the address of the mail notice destination attached to the mail notice request is the address of the controlling apparatus 102, the e-mail transmitted toward SMTP server 601 is transmitted to the service center 100 via LAN 600, the firewall 104, and the Internet 103. The e-mail is further transmitted to the SMTP server 702 via the firewall 701 in the service center, and LAN 700. Then, the e-mail is transmitted to the controlling apparatus 102 via LAN 700 and a Post Office Protocol (POP) server 703.

If the address of the mail notice destination includes the address of a user mail terminal 603 (information processing apparatus such as a personal computer) the administrator, IT personnel, and/or the general affairs personnel at the user side, the e-mail is transmitted to the SMTP server 601, and further transmitted to the user mail terminal 603 via a POP server 602 and LAN 600 at the user side.

The SMTP server 601 and the POP server 602 may be disposed between the firewall 104 and the Internet 103, instead of between the image processing device 100 and the firewall 104. The SMTP server 702 and the POP server 703 may be disposed between the firewall 701 and the Internet 103, instead of between the firewall 701 and the controlling apparatus 102.

FIG. 27 is a flowchart showing an example of process related to SC call by the software programs of the image processing device 100.

When trouble (SC) occurs in the engine unit 217, corresponding sensor detects the SC, and the occurrence of the SC is notified to SCS 306 (step S101 corresponding to S1 of FIG. 15).

In response to receipt of the notice of the occurrence of the SC, SCS 306 detects the SC, and discriminates the contents of the SC. Then, the SCS 306 requests NRS 305 to issue a SC call, and at the same time, stores the contents of the SC call in NVRAM 207 (step S102 corresponding to S2 in FIG. 15).

In response to receipt of the request to issue a SC call from SCS 306, NRS 305 generates a SOAP request of the SC call (converts the request for issuing the SC call into a SOAP request), and request NCS 303 to transmit the SOAP request (step S103 corresponding to S3 in FIG. 15).

Then, NCS 303 converts the SOAP request of the SC call into a HTTP request, and transmit the HTTP request to the intermediate apparatus 101 via the LAN 600 thereby to make the SC call (step S104 corresponding to S4 in FIG. 16).

NRS 305 requests NCS 303 to transmit the HTTP request, and at the same time, starts measuring time using a timer counter (not shown). If NRS 305 receives a SOAP response containing the result of call from NCS 303 before a predetermine time passes (before time out), NRS 305 sends the call result (the success or failure of the SC call) contained in the SOAP response to SCS 306 (step S107 corresponding to S7 in FIG. 15). NRS 305 also sends the contents of the SC call contained in the SOAP body of the SOAP request of the SC call transmitted to NCS 303 to SCS 306 as the SOAP message as is.

If NRS 305 can not receive the SOAP response of the call result from NCS 303 before a predetermined time passes, NRS 305 detects time out, recognizes the failure of the SC call (step S106 corresponding to S6 in FIG. 15), and sends the call result indicating the failure of the SC call to SCS 306 (step S107 corresponding to S7 in FIG. 15). NRS 305 also transmits the contents of the SC call contained in the SOAP body of the SOAP request of the SC call transmitted to NCS 303 to SCS 306 as the SOAP message as is.

In response to receipt of the call result and the SOAP message from NRS 305, SCS 306 attaches information indicating the success or failure of the SC call to the contents of the SC call stored in NVRAM 207 beforehand. Then, SCS 306 reads the contents of the SC call from NVRAM 207, and sends the contents of the SC call to the mail notice application 318 with the SOAP message (step S108 corresponding to S8 FIG. 15).

In response to receipt of the contents of the SC call and the SOAP message from SCS 306, the mail notice application 318 determines whether the contents (event type) of the SC call now received is subject to mail notice, and if not, terminates the process.

If the contents of the SC call received from SCS 306 needs to be transmitted as mail notice, the mail notice application 318 acquires the page information corresponding to the contents of the SC call from the URL for generating the mail body of the web application 314 corresponding to the local host using HTTP-GET as the mail body (step S109 corresponding to S9 in FIG. 15). The mail notice application 318 also attaches the SOAP message received to the mail body of XML format.

Then, the mail notice application 318 acquires the address of the corresponding mail notice destination from NVRAM 207 (step S110 corresponding to S10 in FIG. 15), and sends a mail notice request containing the address of the mail notice destination and the mail body to DCS 316 (step S110 corresponding to S11 in FIG. 15).

In response to receipt of mail notice request from the mail notice application 318, DCS 316 sends the address of the mail notice destination and the mail body attached to the mail notice request to NCS 303 by performing mail notice processing to NCS 303 (step S112 corresponding to S12 in FIG. 15).

NCS 303 transmits an e-mail containing the address of the mail notice destination and the mail body received from DCS 316 to SMTP server 601 via LAN 600.

Processing related to SC call including mail notice processing has been described above. The mail notice processing can be performed when another call such as a supply call and a user call are issued.

Figure 28:
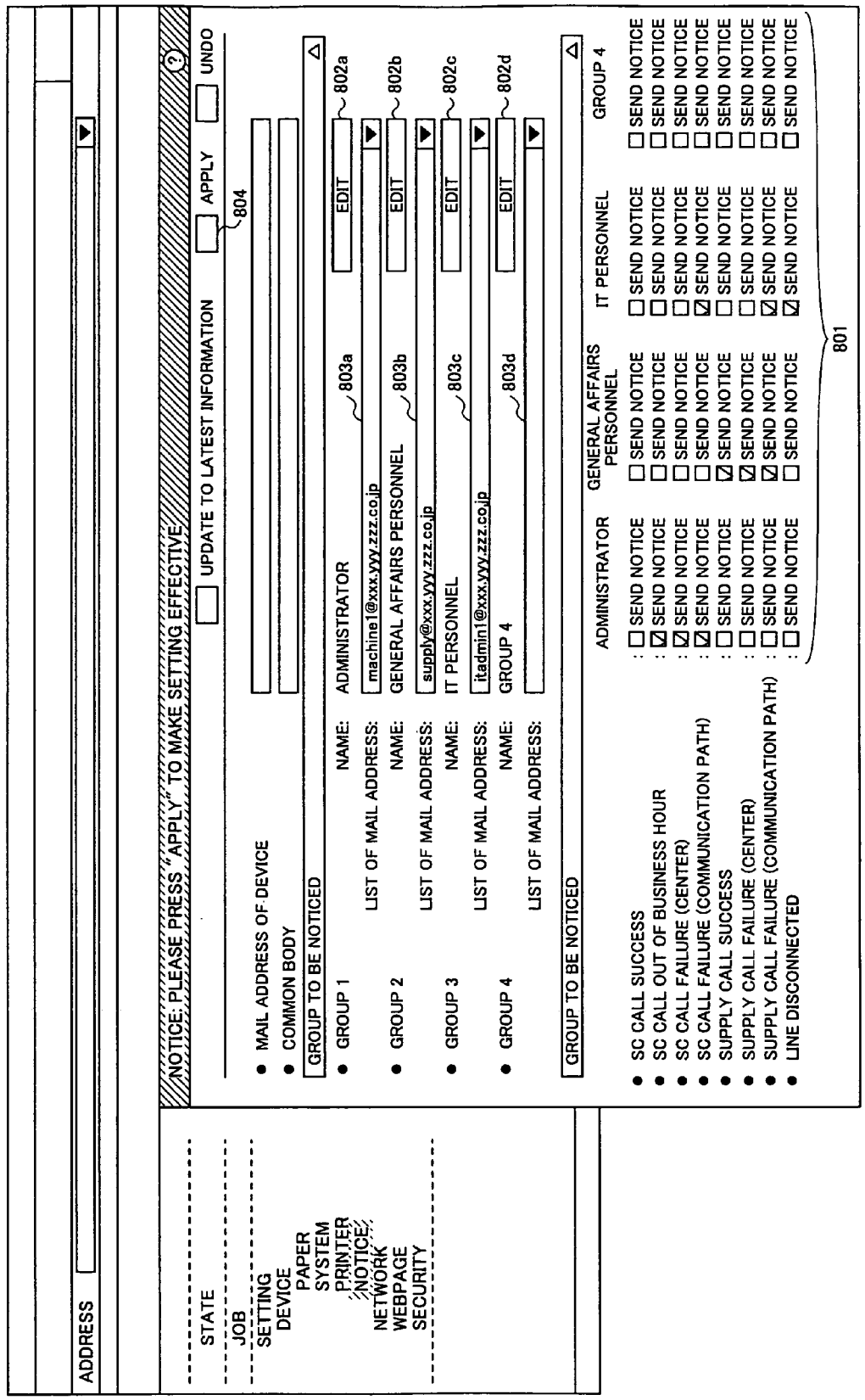
FIG. 28 is a schematic diagram showing an exemplary screen for setting mail notice displayed on a user mail terminal connected to a LAN.

FIG. 28 is a diagram showing an example of a mail notice setting screen as a web page for setting related to mail notice that can be displayed on the user mail terminal 603 (or another terminal apparatus on LAN 600).

The web browser (CPU) of the user mail terminal 603 (FIG. 16) can display a mail notice setting screen as shown in FIG. 28 on its display unit through the operation of a keyboard or a mouse (pointing device), for example.

This mail notice setting screen is provided with check boxes 801, edit buttons 802 (802a, 802b, 802c, 802d), dialog boxes (803a, 803b, 803c, 803d), and an application button 804. The check boxes 801 are used for setting whether mail notice is effective or ineffective for each mail event as described with respect to FIG. 23. The edit buttons 802 are used for inputting and editing the address of destination of each destination group as described with respect to FIG. 24. The dialog boxes 803 are used for displaying selectable address of each destination group. The application button 804 is used for making the setting effective.

In the case of whether the mail notice is effective or ineffective is set for each mail event, the administrator can set whether the mail notice is effective or ineffective for each mail event by selectively clicking the check boxes 801 using a mouse, for example.

The administrator can display a box for inputting the destination name and multiple addresses by clicking the edit button 802 of the destination group (mail notice destination list) that is required to be edited, and input the destination address and multiple addresses using a keyboard.

Further, the administrator can display all addresses (input address) selectable of each destination group by clicking the dialog box 803, select and set a certain address by clicking it, and display the selected address in the dialog box 803.

In the case of the destination group "5", the center address is set as default. Although the destination group "5" is not displayed in the mail notice setting screen of FIG. 28, it can be displayed from the beginning as default, or can be displayed later through a specific operation. In this case, for each mail event (call result), it becomes possible to add the check boxes for setting whether the mail notice is effective or ineffective for each mail event (call result), the editing button for inputting the address of the destination group "5" (controlling apparatus 102), the dialog box for displaying the selectable address for the destination group "5" in the mail notice setting screen. Consequently, it becomes possible to prohibit the controlling apparatus 102 from being sent the mail notice. Additionally, it is possible to add other destination groups.

The contents set through the operation to the mail notice setting screen is made effective by clicking the application button 804, and is stored in NVRAM 207 of the image processing device 100.

Figure 29:
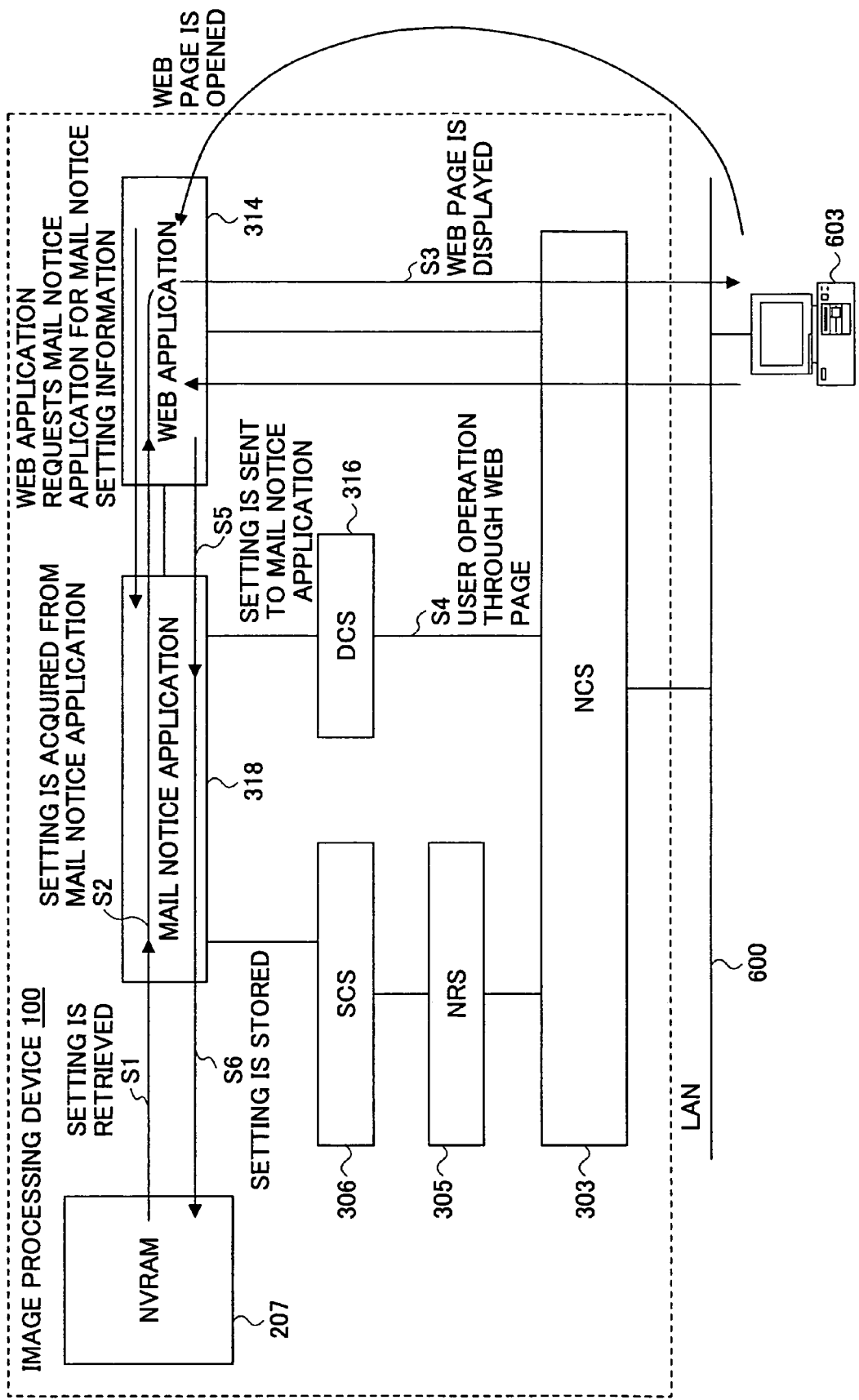
FIG. 29 is a schematic diagram showing an exemplary flow for setting mail notice by software programs in the image processing device of FIG. 3 and the user mail terminal.

FIG. 29 is a diagram showing an example of the flow of setting procedure related to the mail notice by the software programs in the image processing device 100 and the user mail terminal 603 according to an embodiment.

Figure 30:
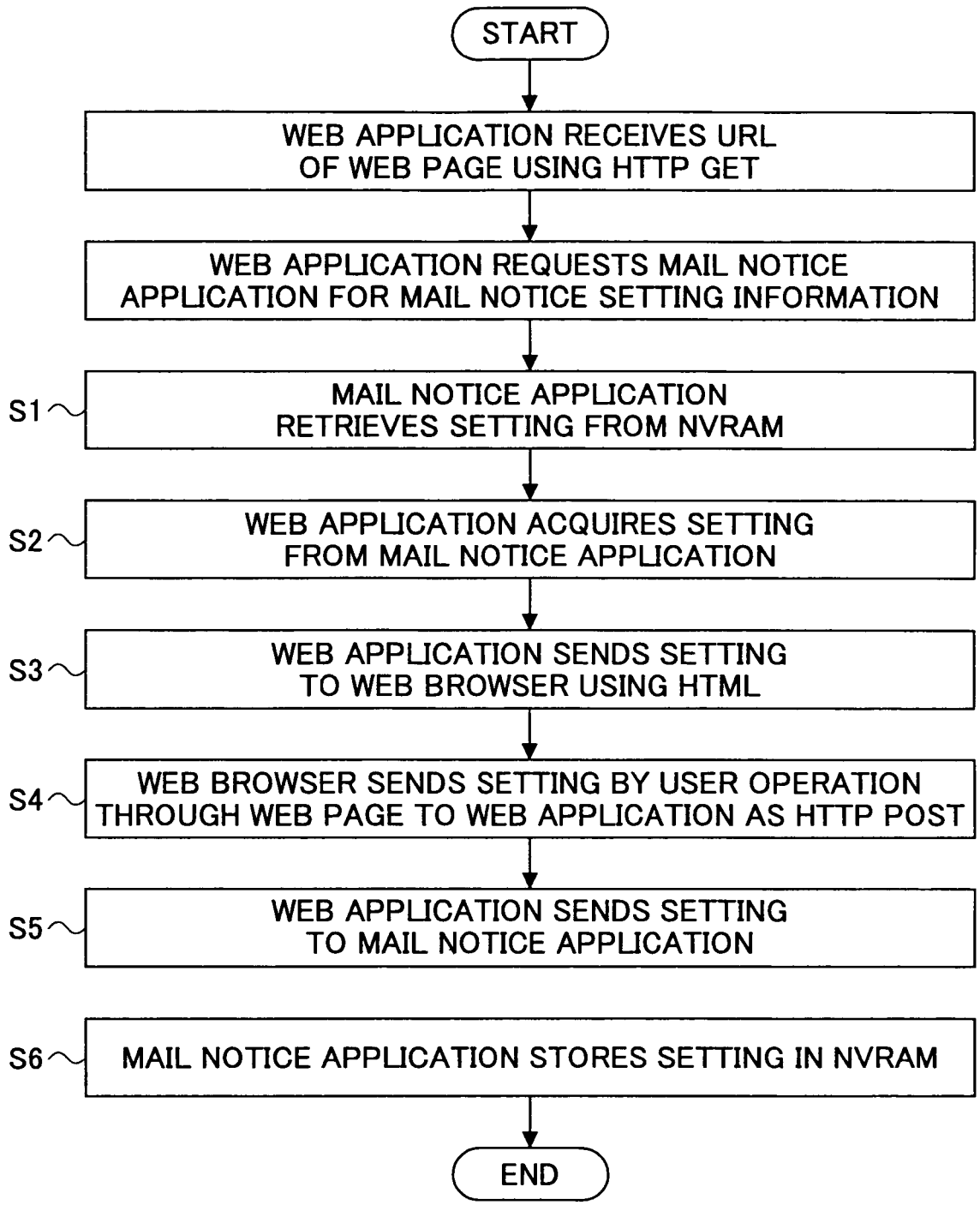
FIG. 30 is a flowchart showing an exemplary process for setting mail notice by software programs of the image processing device of FIG. 3.

FIG. 30 is a flowchart showing an example of mail notice setting processing by the software programs of the image processing device according to an embodiment.

In response to receipt of an instruction to display the mail notice setting screen as a web page of the image processing device 100 by an operation of a keyboard or a mouse, the web browser of the user mail terminal 603 generates a URL for displaying the mail notice setting screen, and sends the URL to the web application 314 via LAN 600 and NCS 303 of the image processing device 100 using the HTTP-GET command. For the above procedures, protocols of SOAP and HTTP need to be used, but their description is omitted here.

In response to receipt of the URL for displaying the mail notice setting screen (web page) using the HTTP-GET command from the web browser of the user mail terminal 603, the web application 314 of the image processing device 100 acquires page information of HTML format from that URL as the mail notice setting screen information. The mail notice setting information is sent to the mail notice application 318.

In response to receipt of the mail notice setting information, the mail notice application 318 reads the contents of setting related to the mail notice from NVRAM 207.

Web application 314 acquires the setting related to the mail notice read by the mail notice application 318, adds it to the mail notice setting screen information already acquired, and sends them to the web browser of the user mail terminal 603 via NCS 303 and LAN 600 as a response.

In response to receipt of the mail notice setting screen information (web page information), the web browser of the user mail terminal 603 displays the mail notice setting screen as shown in FIG. 28 on the display unit based on the information.

After setting related to the mail notice is input by the operation to the mail notice setting screen (web page), and the application button 804 is clicked using a mouse, for example, the web browser of the user mail terminal makes the setting effective, and sends the contents of the setting related to the mail notice to the web application 314 via LAN 600 and NCS 303 of the image processing device as HTTP-POST (information indicating the completion of processing).

In response to receipt of the contents of setting related to the mail notice from the web browser of the user mail terminal 603, the web application 314 of the image processing device 100 sends the contents of setting to the mail notice application 318.

The mail notice application 318 receives the contents of setting related to mail notice, and stores them in NVRAM 207. Old contents of setting stored in NVRAM 207 is erased by overwriting, and updated to the new contents of setting.

Although not shown in the drawings, when the contents of setting related to the mail notice is stored in NVRAM 207, the mail notice application 318 sends information (mail notice setting completion information) indicating that the setting related to the mail notice has been completed to the web application 314.

The web application 314 sends the mail notice setting completion information received from the mail notice application 318 to the web browser of the user mail terminal 603 as a response via NCS 303 and LAN 600.

In response to receipt of the mail notice setting completion information, the web browser of the user mail terminal 603 displays the mail notice setting screen, and notifies the operator that the setting related to the mail notice has been completed.

The image processing device according to the present embodiments can provide the following advantages.

(1) The image processing device transmits a communication request (HTTP request) including an operation request (SOAP request) to the intermediate apparatus or the controlled apparatus. If the image processing device can not receive normal operation response (SOAP response) to the operation request (failure of communication), the image processing device includes the operation request in an e-mail that uses a protocol such as SMTP other than HTTP, and transmits the e-mail to the controlling apparatus. According to the above arrangements, the image processing device can transmits the operation request to the controlling apparatus without fail even if the image processing device is disposed inside the firewall or the intermediate apparatus.

(2) The operation request can be written in XML format, and the operation request (SOAP message) can be included in the mail body. The controlling apparatus can process the operation request in the same manner regardless whether the operation request is transmitted in HTTP or in an e-mail. According to the above arrangements, processing load of the controlling apparatus can be reduced.

(3) In the case in which a normal operation response to the operation request can not be received, an e-mail indicating that the normal operation response can not be received is transmitted to the user mail terminal of a user (administrator, general affairs personnel, IT personnel, for example), the user can recognize the contents of the operation request. If the controlling apparatus does not send an operation response to the operation request, the user can make a phone call or send a facsimile message to the operator (center operator) of the controlling apparatus. According to the above arrangements, the operation request can be transmitted to the control apparatus without fail.

(4) The destination of the above e-mail is changed in accordance with the type of operation request (call result) to which a normal operation response can not be received. According to the above arrangements, measure for the failure in communication can be made efficient.

The image processing device 110 having communication function (intermediate function) and the image processing device 100 connected to the intermediate apparatus 101 having communication function have been described as preferred embodiments of the present invention. The present invention is not limited to the above, but applicable to various electronic apparatuses having communication function or connected to an intermediate apparatus having communication function. An example of the electronic apparatus may include a network home appliance, an automatic selling machine, medical equipment, a power supply unit, an air conditioning system, a measuring system for gas, water, electricity, for example, an audio visual appliance, a game machine, and a computer system that can be connected to a network. Additionally, a remote control system including these apparatuses as controlled apparatuses can operate in the same manner as described above. In the case of a remote control system that remote controls an electronic apparatus, the configuration and structure of the electronic apparatus, the intermediate apparatus, and the controlling apparatus and the connection thereof are not limited to the above embodiments. The communication between the electronic apparatus and the controlling apparatus may be any suitable channel that can form a network regardless of wired or wireless. The intermediate apparatus also can be remote controlled as a controlled apparatus.

Figure 31:
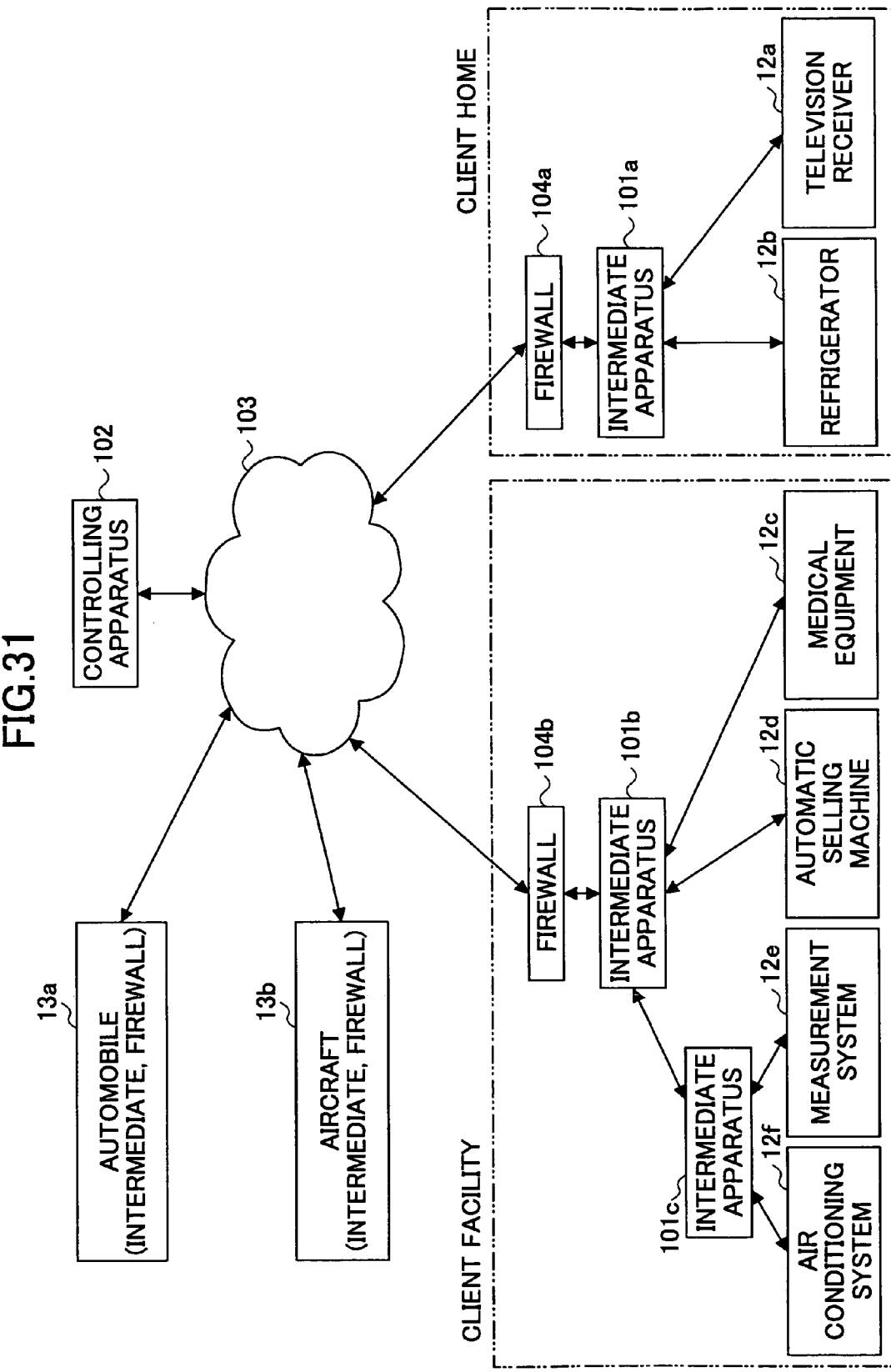
FIG. 31 is a schematic diagram showing the configuration of a remote control system according to another embodiment.

For example, it is possible to form a remote control system in which various electronic apparatuses are controlled as shown in FIG. 31 as an example of the remote control system shown in FIG. 1. The remote control system of FIG. 31 includes network home appliances such as a television receiver 12a and a refrigerator 12b, medical equipment 12c, an automatic selling machine 12d, a measuring system 12e, an air conditioning system 12f as examples of controlled apparatus with separate intermediate apparatus 101. Additionally, the remote control system of FIG. 31 further includes an automobile 13a and an aircraft 13b having embedded intermediate apparatus 101. In the case of the automobile 13a and the aircraft 13b that moves in a wide range, the firewall (FW) 104 is preferably embedded therein.

The present invention can be embodied as a computer program that causes the computer (CPU) of the image processing device described above to perform as a communication request transmission unit and a mail transmission unit. The above advantages can be obtained by executing the computer program by the computer.

Such a computer program can be pre-installed in a storage unit such as ROM or HDD provided to the computer. The computer program may be provided by storing a non-volatile recording medium such as a CD-ROM, a flexible disk, SRAM, EEPROM, and a memory card. The computer program stored in the above non-volatile recording medium can cause the computer to perform as the above units if the computer program is installed to the computer and executed by the CPU, or read from the non-volatile recording medium and executed by the CPU.

The computer program can be stored in an external storage unit or internal storage unit of an external device and downloaded thereby to be executed by the CPU.

The preferred embodiments of the present invention are described above. The present invention is not limited to these embodiments, but variations and modifications may be made without departing from the scope of the present invention.

This patent application is based on Japanese priority patent applications No. 2004-81255 filed on Mar. 19, 2004, and No. 2005-62507 filed on Mar. 7, 2005, the entire contents of which are hereby incorporated by reference.

What is claimed is:

1. An apparatus that can be remotely controlled by a controlling apparatus via a network, the apparatus comprising:
    a communication request transmission unit configured to transmit a communication request including an operation request to the controlling apparatus;
    a non-transitory memory that stores setting information indicating, for each of a plurality of different results of the operation request, whether an email notice should be performed; and
    a mail transmission unit configured to transmit, when both a normal operation response to the operation request has not been received and when the stored setting information indicates that the email notice should be performed, an e-mail message that includes the operation request to the controlling apparatus,
    wherein the apparatus is connected to the network via an intermediate apparatus configured to generate and transmit an intermediate operation request to the controlling apparatus, to receive an intermediate operation response from the controlling apparatus, and, in response to any of a user call, a service person call, and a supply call, to attach its own identifier to the operation request, and to convey the call to the controlling apparatus.

2. The apparatus as claimed in claim 1, wherein the apparatus is connected to the network via a firewall.

3. The apparatus as claimed in claim 1, wherein said mail transmission unit is further configured to transmit, when a normal operation response to the operation request has not been received, an e-mail message indicating so to a terminal apparatus of a user of the apparatus.

4. The apparatus as claimed in claim 3, wherein said mail transmission unit is further configured to change the destination of the e-mail message based on the type of operation request to which the normal operation response has not been received.

5. The apparatus as claimed in claim 1, wherein
    said communication request transmission unit is further configured to transmit a HTTP request including a SOAP request to the controlling apparatus; and
    said mail transmission unit is further configured to transmit, when a normal SOAP response to the SOAP request has not been received, an e-mail message including the SOAP request to the controlling apparatus.

6. The apparatus as claimed in claim 5, said mail transmission unit is further configured to transmit, when a normal SOAP response to the SOAP request has not been received, an e-mail message indicating so to a terminal apparatus of a user of the apparatus.

7. The apparatus as claimed in claim 6, wherein said mail transmission unit is further configured to change the destination of the e-mail message based on the type of SOAP request to which the normal SOAP response has not been received.

8. A remote control system, comprising:
    an apparatus;
    a controlling apparatus configured to remotely control said apparatus via a network; and
    an intermediate apparatus configured to generate and transmit an intermediate operation request to the controlling apparatus, to receive an intermediate operation response from the controlling apparatus and, in response to any of a user call, a service person call, and a supply call, to attach its own identifier to the operation request, and to convey the call to the controlling apparatus,
    wherein said apparatus is configured to transmit a communication request including an operation request to said controlling apparatus, the apparatus includes a non-transitory memory that stores setting information indicating, for each of a plurality of different results of the operation request, whether an email notice should be performed, and the apparatus is configured to transmit, when both a normal operation response to the operation request has not been received and when the stored setting information indicates that the email notice should be performed, an e-mail message that includes the operation request to said controlling apparatus;
    said controlling apparatus is configured to receive the communication request from said apparatus, and transmit a communication response indicating whether the receipt of the communication request has been successfully completed to said apparatus; and
    the apparatus is connected to the network via the intermediate apparatus.

9. The remote control system as claimed in claim 8, wherein the apparatus is connected to the network via a firewall.

10. The remote control system as claimed in claim 8, wherein said apparatus is further configured to transmit, when a normal operation response to the operation request has not been received, an e-mail message indicating so to a terminal apparatus of a user of said apparatus.

11. The remote control system as claimed in claim 8, wherein said apparatus is further configured to change the destination of the e-mail message based on the type of operation request to which the normal operation response has not been received.

12. The remote control system as claimed in claim 8,
    wherein said apparatus is further configured to transmit a HTTP request including a SOAP request to said controlling apparatus, and transmit, when a normal SOAP response to the SOAP request has not been received, an e-mail message including the SOAP request to said controlling apparatus; and
    said controlling apparatus is further configured to receive the HTTP request from said apparatus, and transmit a HTTP response indicating whether the receipt of the HTTP request has been successfully completed to said apparatus.

13. The remote control system as claimed in claim 12, wherein said apparatus is further configured to transmit, when a normal operation response to the operation request has not been received, an e-mail message indicating so to a terminal apparatus of a user of said apparatus.

14. The remote control system as claimed in claim 12, wherein said apparatus is further configured to change the destination of the e-mail message based on the type of operation request to which the normal operation response has not been received.

15. In a system including a controlling apparatus and an apparatus connected to the controlling apparatus via a network, wherein the apparatus is connected to the network via an intermediate apparatus, a method of remotely controlling the apparatus via the network, the apparatus including a non-transitory memory that stores setting information indicating, for each of a plurality of different results of the operation request, whether an email notice should be performed, the method comprising:
   transmitting a communication request including an operation request to the controlling apparatus via the intermediate apparatus, which is configured to generate and transmit an intermediate operation request to the controlling apparatus, to receive an intermediate operation response from the controlling apparatus, and, in response to any of a user call, a service person call, and a supply call, to attach its own identifier to the operation request, and to convey the call to the controlling apparatus; and
   transmitting, when both a normal operation response to the operation request has not been received and when the stored setting information indicates that the email notice should be performed, an e-mail message that includes the operation request to the controlling apparatus.

16. A non-transitory computer readable medium storing a set of coded instructions that causes a computer included in an apparatus connected to a controlling apparatus via a network, the apparatus including a non-transitory memory that stores setting information indicating, for each of a plurality of different results of the operation request, whether an email notice should be performed, to perform the steps of:
   transmitting a communication request including an operation request to the controlling apparatus via an intermediate apparatus, wherein the apparatus is connected to the network via the intermediate apparatus, which is configured to generate and transmit an intermediate operation request to the controlling apparatus, to receive an intermediate operation response from the controlling apparatus, and, in response to any of a user call, a service person call, and a supply call, to attach its own identifier to the operation request, and to convey the call to the controlling apparatus; and
   transmitting, when both a normal operation response to the operation request has not been received and when the stored setting information indicates that the email notice should be performed, an e-mail message that includes the operation request to the controlling apparatus.

17. The remote control system of claim 8, wherein the controlling apparatus is configured to transmit, in response to the intermediate operation request, a delay notice, when the controlling apparatus can not return the intermediate operation response immediately.

18. The remote control system of claim 8, wherein the controlling apparatus is configured to transmit, in response to the operation request, a delay notice to the intermediate apparatus, when the controlling apparatus can not return the operation response immediately; and
   when the controlling apparatus does not return the operation response within a predetermined time interval, the apparatus is configured to treat the operation request as timed out.

19. The remote control system of claim 8, further comprising a second intermediate apparatus connected between the apparatus and the intermediate apparatus.

20. The apparatus as claimed in claim 8, wherein the intermediate apparatus is configured to indicate that the call was successfully when receipt of the operation request has been normally completed.

21. The apparatus as claimed in claim 8, wherein the intermediate apparatus is configured to detect time out, and to generate a response containing a response of the call result indicating that the call was unsuccessful, when the intermediate apparatus can not receive a response from the controlling apparatus until a predetermined time passes after the transmission of the request of the call to the controlling apparatus.

22. The apparatus as claimed in claim 8, further comprising:
   a network control service (NCS) unit configured to intermediate between the network and a plurality of application programs of the application module layer.

23. The apparatus as claimed in claim 22, wherein when the NCS unit does not receive a response containing a response of the call result from the intermediate apparatus until a predetermined time period passes, a new remote control service is configured to detect a time out and to determine that the call has failed.

24. The apparatus of claim 9, wherein
   the firewall is provided between the intermediate apparatus and the controlling apparatus; and
   the intermediate apparatus periodically transmits a predetermined HTTP request to the controlling apparatus.

25. The apparatus of claim 22, wherein the NCS unit is configured to operate as an HTTP client and an HTTP server, to receive an HTTP request or an HTTP response transmitted by the intermediate apparatus, and to transmit the HTTP request or the HTTP response to the intermediate apparatus.

* * * * *